(12) United States Patent
Jiang et al.

(10) Patent No.: US 11,081,954 B2
(45) Date of Patent: Aug. 3, 2021

(54) PHASE SHEDDING CONTROL METHOD USED IN MULTIPHASE SWITCHING CONVERTERS WITH DAISY CHAIN CONFIGURATION

(71) Applicant: Chengdu Monolithic Power Systems Co., Ltd., Chengdu (CN)

(72) Inventors: Lijie Jiang, Hangzhou (CN); Yongheng Sun, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/934,365

(22) Filed: Jul. 21, 2020

(65) Prior Publication Data
US 2021/0028683 A1    Jan. 28, 2021

(30) Foreign Application Priority Data
Jul. 26, 2019  (CN) .......................... 201910686416.6

(51) Int. Cl.
| | | |
|---|---|---|
| *H02M 3/158* | (2006.01) | |
| *H02M 1/00* | (2006.01) | |
| *H02M 1/084* | (2006.01) | |
| *H02M 1/088* | (2006.01) | |

(52) U.S. Cl.
CPC ........... *H02M 1/084* (2013.01); *H02M 1/088* (2013.01); *H02M 3/1584* (2013.01); *H02M 1/0067* (2021.05); *H02M 1/0077* (2021.05)

(58) Field of Classification Search
CPC . H02M 1/0067; H02M 1/0077; H02M 3/1584
USPC .......................... 323/271–272, 282, 284–285
See application file for complete search history.

(56) References Cited

U.S. PATENT DOCUMENTS

| | | | |
|---|---|---|---|
| 7,982,441 B2* | 7/2011 | Crowther ............ | H02M 3/1584 323/237 |
| 8,493,044 B2* | 7/2013 | Xu ...................... | H02M 3/1588 323/282 |
| 9,606,559 B2* | 3/2017 | Ozawa ................... | G05F 1/575 |
| 9,755,517 B2* | 9/2017 | Kobayashi ............ | H02M 3/158 |
| 9,912,240 B1 | 3/2018 | Nguyen et al. | |
| 10,270,343 B2 | 4/2019 | Nguyen et al. | |
| 2008/0036526 A1* | 2/2008 | Wu ....................... | H02M 3/157 327/520 |
| 2009/0179619 A1* | 7/2009 | Houston .............. | H02M 3/156 323/212 |

* cited by examiner

*Primary Examiner* — Gary A Nash
(74) *Attorney, Agent, or Firm* — Perkins Coie LLP

(57) ABSTRACT

A multiphase switching converter with automatic phase shedding control, wherein the multiphase switching converter includes a plurality of switching circuits coupled in parallel, and a plurality of control circuits configured in a daisy chain and respectively configured for driving a corresponding one of the plurality of switching circuits. Each of the control circuit generates a current threshold based on a corresponding sequence information, and compares a current indication signal indicative of a load current of the multiphase switching converter with the current threshold to determine whether to enter into a phase shedding mode.

20 Claims, 17 Drawing Sheets

PHASE SHEDDING CONTROL METHOD USED IN MULTIPHASE SWITCHING CONVERTERS WITH DAISY CHAIN CONFIGURATION

CROSS-REFERENCE TO RELATED APPLICATIONS

This application claims the benefit of CN application 201910686416.6, filed on Jul. 26, 2019, and incorporated herein by reference.

TECHNICAL FIELD

The present invention generally relates to electronic circuits, and more particularly but not exclusively, to multiphase switching converters.

BACKGROUND

In recent years, multiphase switching converters with outstanding performance in thermal, EMI and load transient response are widely used in power solutions for central processing units (CPUs).

The number of phases in the multiphase switching converter is determined by the load, and needs to be increased when current required by the load increases. For multiphase switching converters with single controller, this means logic, circuit, structure and size of the controller all need to be adjusted, which undoubtedly increases the burden of system development and overall cost.

Therefore, daisy chain architecture with good scalability is introduced into the multi-phase switch converter, wherein a plurality of control circuits are utilized and each of the control circuit is used for driving one phase. In this configuration, the total phase number of the multiphase phase switching converter can be easily adjusted according to practical applications. If the phase number needs to be increased, users only need to add new control circuits and corresponding components into the daisy chain, with very simple adjustment of electrical connections.

However, how to realize phase shedding (or called "phase cutting") control in multi-phase switching converters, so the converter can adjust the number working phases, which join power operation to provide power to the load, in accordance with the load current, has become a new challenge.

SUMMARY

Embodiments of the present invention are directed to a control circuit used in a multiphase switching converter, wherein the multiphase switching converter includes a plurality of switching circuits coupled in parallel, and a plurality of control circuits configured in a daisy chain. The control circuit comprises: a first terminal configured to share a phase control signal with the rest of the plurality of control circuits; a second terminal configured to receive a phase input signal from a previous control circuit in the daisy chain; and a third terminal configured to provide a phase output signal to a latter control circuit in the daisy chain, wherein based on the phase input signal and phase control signal, the control circuit generates the phase output signal, and a switch control signal for controlling a corresponding one of the plurality of switching circuits. The control circuit generates a current threshold based on a sequence information, and compares a current indication signal indicative of a load current of the multiphase switching converter with the current threshold to determine whether to enter into a phase shedding mode.

Embodiments of the present invention are also directed to a multiphase switching converter comprising: a plurality of switching circuits coupled in parallel between an input voltage and a load; and a plurality of control circuits configured in a daisy chain and respectively configured for driving a corresponding one of the plurality of switching circuits. Each of the plurality of control circuits includes: a first terminal configured to share a phase control signal with the rest of the plurality of control circuits; a second terminal configured to receive a phase input signal from a previous control circuit in the daisy chain; and a third terminal configured to provide a phase output signal to a latter control circuit in the daisy chain. The control circuit generates a current threshold based on a corresponding sequence information, and compares a current indication signal indicative of a load current of the multiphase switching converter with the current threshold to determine whether to enter into a phase shedding mode, wherein in the phase shedding mode, the control circuit stops the corresponding switching circuit from providing power to the load, and gets the phase output signal to be substantially identical the phase input signal.

Embodiments of the present invention are further directed to a phase shedding control method used in a control circuit of a multiphase switching converter, wherein the multiphase switching converter includes a plurality of switching circuits coupled in parallel, and a plurality of control circuits configured in a daisy chain and respectively configured for driving a corresponding one of the plurality of switching circuits. The phase shedding control method includes: obtaining a current indication signal indicative of a load current of the multiphase switching converter; obtaining a sequence information of the control circuit; generating a current threshold based on the sequence information; and comparing the current indication signal with the current threshold to determine whether to disable the corresponding switching circuit of the control circuit.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
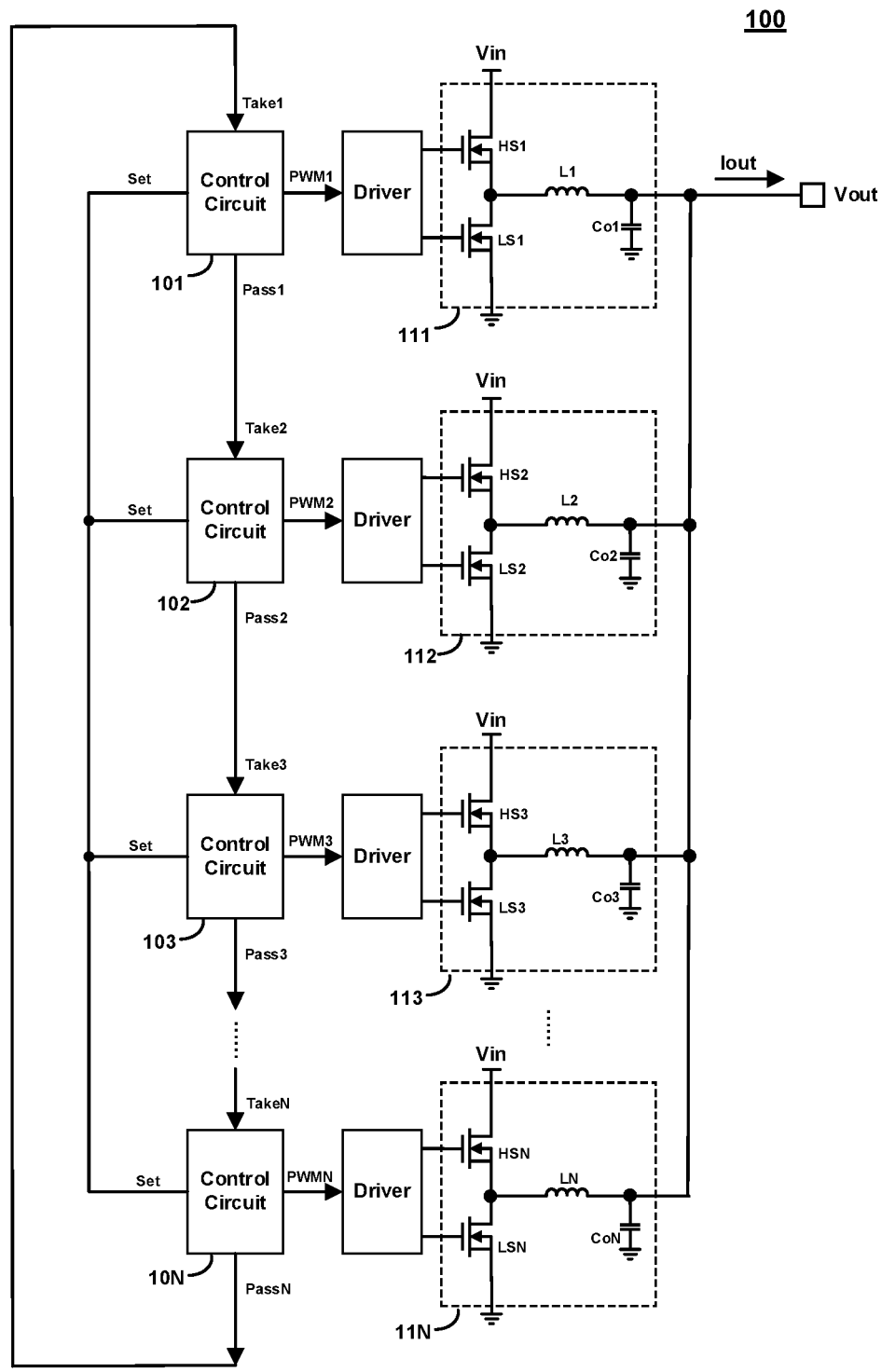
FIG. 1 is a schematic block diagram of a multiphase switching converter 100 in accordance with an embodiment of the present invention.

FIG. 1 is a schematic block diagram of a multiphase switching converter 100 in accordance with an embodiment of the present invention. It includes a plurality of switching circuits 111~11N coupled in parallel, and a plurality of control circuits 101~10N configured in a daisy chain, wherein N is an integer greater than 1. Each of the switching circuits has an input terminal coupled to an input voltage Vin and an output terminal coupled to a load to provide an output voltage Vout. The control circuits 101~10N are respectively coupled to one of the switching circuits 111~11N. Each control circuit $10i$ (i=1, 2, ..., N) has a first terminal, a second terminal and a third terminal, wherein the first terminal is coupled with the first terminals of the rest of control circuits to share a phase control signal Set, the second terminal of the control circuit $10i$ is coupled to the third terminal of a previous control circuit in the daisy chain to receive a phase input signal Takei, and the third terminal of the control circuit $10i$ is coupled to the second terminal of a latter control circuit in the daisy chain to provide a phase output signal Passi. Based on the phase input signal Takei and the phase control signal Set, the control circuit $10i$ generates the phase output signal Passi, and a switch control signal PWMi for controlling the corresponding switching circuit $11i$. In some embodiments, the switching circuit $11i$ is configured in synchronous BUCK (also called "step-down circuit"), which includes a high side transistor HSi, a low side transistor LSi, an inductor Li and an output capacitor Coi. When the switch control signal PWMi is logical high, the high side transistor HSi is on and the low side transistor LSi is off. When the switch control signal PWMi is logical low, the high side transistor HSi is off and the low side transistor LSi is on. Of course, there might be dead time intentionally involved to avoid shoot through of the high side and low side transistors.

The phase control signal Set includes a plurality of pulses, such as PULSE 1~PULSE N, for successively triggering the plurality of switching circuits to provide power to the load. Generally speaking, the switch control signals PWM1~PWMN are respectively synchronized with the plurality of pulses PULSE 1~PULSE N. For example, the rising edge of the switch control signal PWMi is synchronized with the rising edge of PULSE i, so that the high side transistor HSi is turned on and the low side transistor LSi is turned off at the rising edge of PULSE i, and the corresponding switching circuit $11i$ is triggered to provide power to the load. In the embodiment shown in FIG. 1, the phase control signal Set could be generated by one of the control circuits, or come from an independent signal generating circuit.

Each of the control circuits generates a current threshold according to its sequence information, and compares a load indication signal, which is indicative of the load current, with the current threshold to determine whether to enter into a phase shedding mode. In the phase shedding mode, the control circuit disables the corresponding switching circuit (i.e. stops the corresponding switching circuit from providing power to the load), and get its phase output signal to be equal to its phase input signal. The sequence information is indicative of a sequence number, which is used to distinguish the control circuits in daisy chain. In a N-phase converter, the sequence number is usually expressed as numbers 1, 2, . . . , and N. The sequence number could correspond to physical connection sequence of the plurality of control circuits in daisy chain. However, this is not limiting, and the sequence number could also be independent from and irrelevant to the physical connection sequence. In one embodiment, the sequence number 1, 2, . . . , and N respectively correspond to the control circuits 101, 102, . . . , 10N shown in FIG. 1, and the control circuit enters into the phase shedding mode when the current indication signal is lower than the current threshold.

By doing so, the multiphase switching converter could realize phase shedding control, and automatically adjust the number of working phases according to the load current. When the load current is small, only part of the plurality of switching circuits work and provide power to the load, while the other switching circuits are disabled to reduce switching loss.

Figure 2:
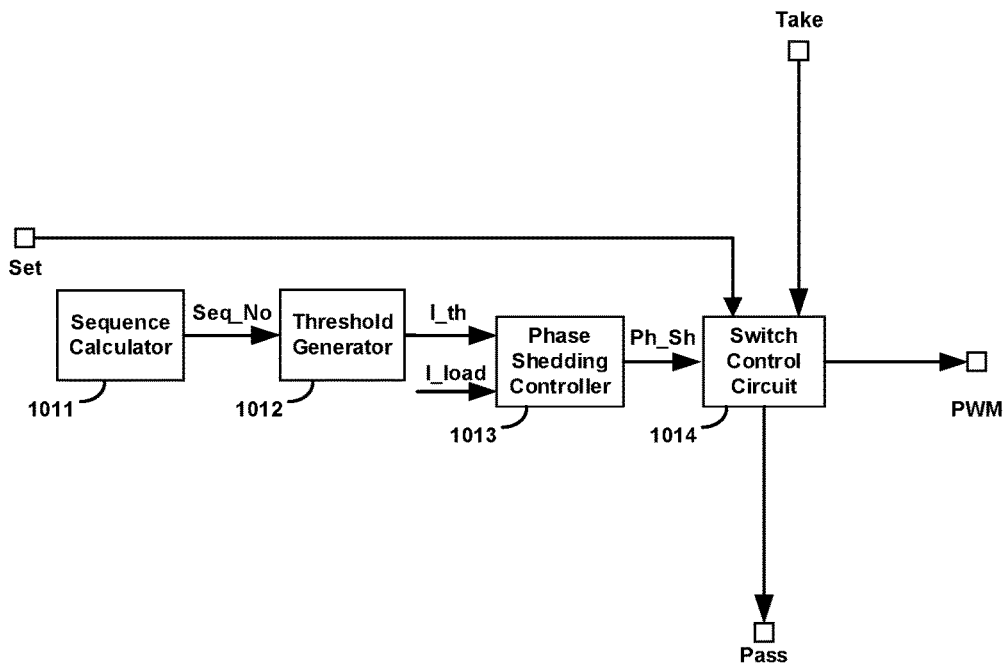
FIG. 2 is a schematic block diagram of a control circuit used in the multiphase switching converter 100 in accordance with an embodiment of the present invention.

FIG. 2 is a schematic block diagram of a control circuit used in the multiphase switching converter 100 in accordance with an embodiment of the present invention. The control circuit includes a sequence calculator 1011, a threshold generator 1012, a phase shedding controller 1013, and a switch control circuit 1014. The sequence calculator 1011 is configured to obtain sequence information Seq_No of the control circuit. The threshold generator 1012 is coupled to the sequence calculator 1011 to receive the sequence information Seq_No, and configured to generate a current threshold I_th based on the sequence information. The phase shedding controller 1013 is coupled to the threshold generator 1012. The phase shedding controller 1013 compares a current indication signal I_load, which is indicative of the load current, with the current threshold I_th to generate a phase shedding control signal Ph_Sh. The switch control circuit 1014 generates a switch control signal PWM for controlling the corresponding switching circuit, and a phase output signal Pass based on a phase control signal Set, a phase input signal Take, and the phase shedding control signal Ph_Sh. Generally, if the current indication signal I_load is lower then the current threshold I_th, the switch control circuit 1014 will disable the corresponding switching circuit to stop it from providing power to the load, and will get the phase output signal Pass to become equal to the phase input signal Take.

Figure 3:
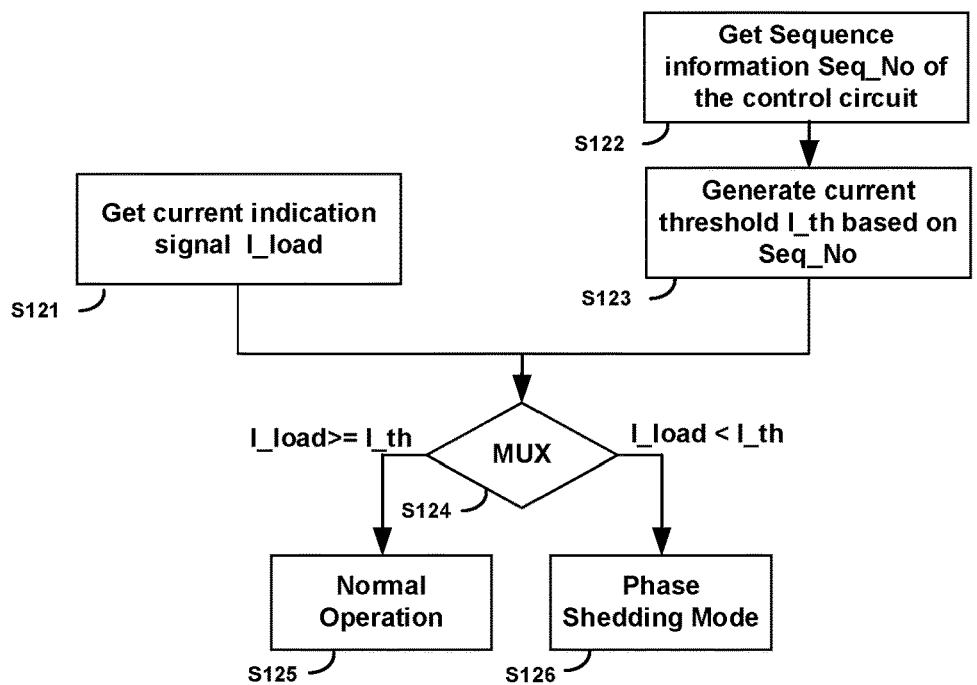
FIG. 3 is a working flowchart of the control circuit shown in FIG. 2, in accordance with an embodiment of the present invention.

FIG. 3 is a working flowchart of the control circuit shown in FIG. 2, in accordance with an embodiment of the present invention. It includes steps S121~S126.

At step S121, the current indication signal I_load indicative of the load current is obtained. There are many ways to get the current indication signal. For instance, it could be gained by sensing an output current Iout of the multiphase switching converter through a current sensing circuit (e.g. current sensing resistor, current transformer, etc.), wherein a real time value of the load current is reflected. In some embodiments, the current indication signal I_load could also be directly provided by a host controller or the load, and represent an expected value of the load current.

At step S122, the sequence information of the control circuit is obtained. There also exist many schemes to get the sequence information. In some embodiments, an electrical characteristic (e.g. voltage, current or resistance) of a certain pin in the control circuit is detected, and then further process, such as calculation or look-up table, based on the detected value is conducted to get the sequence information. In some other embodiments, a plurality of pulses in the phase control signal are modulated, so they could contain the sequence information of the control circuits. And based on the received phase input signal Take and phase control signal Set, the control circuit obtains its own sequence information.

At step S123, the current threshold I_th is generated based on the sequence information Seq_No. The current threshold I_th can be generated through one or more of calculation, look-up table, signal conversion, etc. In general, the larger the Seq_No, the higher the current threshold I_th. In some embodiments, I_th=Seq_No*I_phase, wherein I_phase is a predetermined value, or a value which could be adjusted by users.

At step S124, the current indication signal I_load is compared with the current threshold I_th. If the current indication signal I_load is greater than or equal to the current threshold I_th, the process will proceed to step S125, and the control circuit will work normally. Based on the phase input signal Take, the switch control circuit will trigger the corresponding switching circuit to provide power to the load, when the corresponding pulse in the phase input signal Set emerges.

If the current indication signal I_load is less than the current threshold I_th, the process will proceed to step S126, wherein the control circuit enters the phase shedding mode to disable the corresponding switching circuit. At the same time, the phase output signal Pass is set to be equal to the phase input signal Take.

Figure 4A:
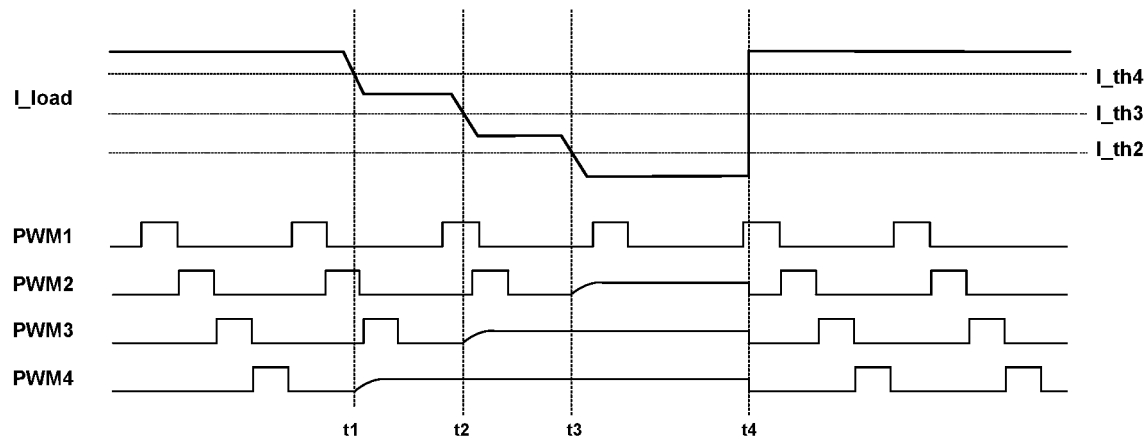
FIGS. 4A and 4B show operation waveforms of a four-phase switching converter in phase shedding mode, in accordance with an embodiment of the invention.
Figure 4B:
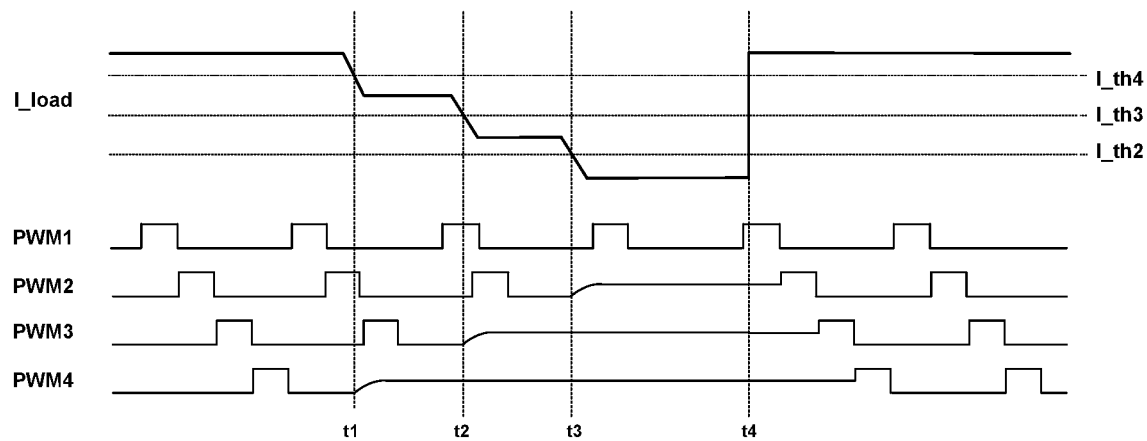

FIGS. 4A and 4B show operation waveforms of a four-phase switching converter in phase shedding mode, in accordance with an embodiment of the invention. PWM1~PWM4 are switch control signals of the four phases, I_th2, I_th3 and I_th4 are current threshold respectively corresponding to the control circuits (such as 102~104 of FIG. 1) with Seq_No of 2, 3 and 4. As shown in FIG. 4A, when the current indication signal I_load decreases to be lower than I_th4 at t1, the control circuit 104 enters into the phase shedding mode. The switch control signal PWM4 is changed in to a high impedance state to disable the corresponding switching circuit 114, the transistors HS4 and LS4 are both turned off to stop providing power to the load. Similarly, when the current indication signal I_load further decreases to be lower than I_th3 at t2, the control circuit 103 enters into the phase shedding mode, and the switch control signal PWM3 is changed in to the high impedance state to disable the corresponding switching circuit 113. When the current indication signal I_load decreases to be lower than I_th2 at t3, the control circuit 102 enters into the phase shedding mode, and the switch control signal PWM2 is changed in to the high impedance state to disable the corresponding switching circuit 112. At t4, the current indication signal I_load increases to be larger than I_th2, I_th3 and I_th4 (with hysteresis ignored), thus all the switch control circuits resume to normal operation. In the embodiment shown in FIG. 4A, the switch control signals PWM2~PWM4 are changed from the high impedance state into logical low at t4.

In some other embodiments, such as shown in FIG. 4B, to avoid undershoot at the output voltage Vout, the switch control signals PWM2~PWM4 are kept at the high impedance state after t4, until they are sequentially changed into logical high for triggering the corresponding switching circuits to provide power to the load.

Figure 5A:
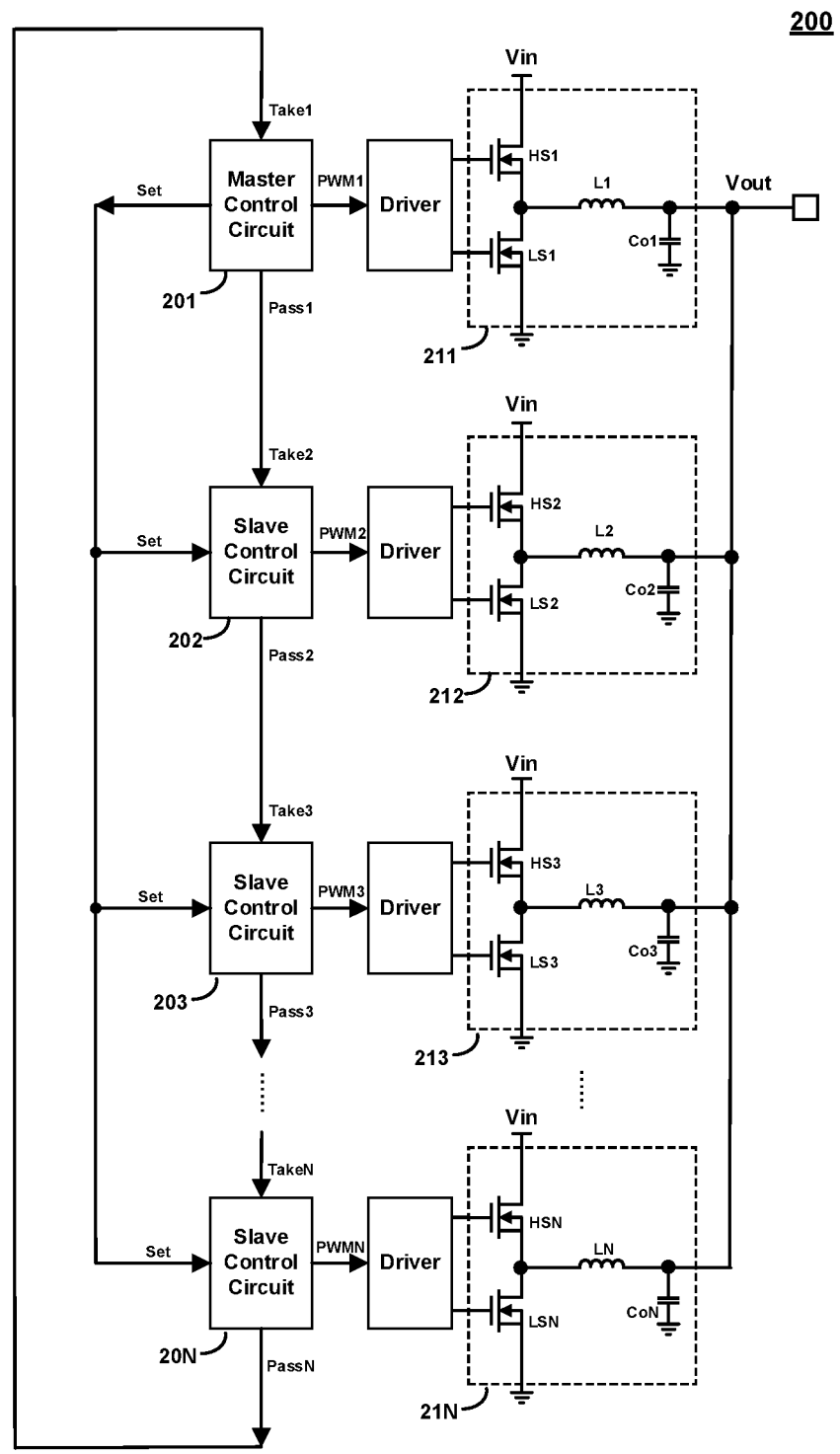
FIG. 5A is a schematic block diagram of a multiphase switching converter 200 in accordance with an embodiment of the present invention.
Figure 5B:
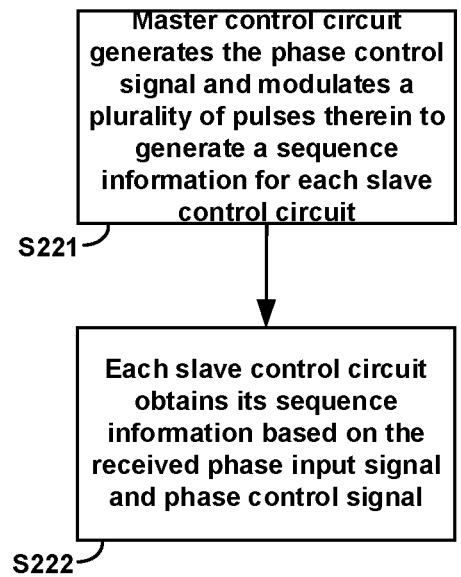
FIG. 5B is a flowchart of a sequence assignment method used in the multiphase switching converter 200 in accordance with an embodiment of the present invention.

FIG. 5A is a schematic block diagram of a multiphase switching converter 200 in accordance with an embodiment of the present invention, wherein the circuit configuration is similar to that shown in FIG. 1. Among control circuits 201~20N, 201 is configured as a master control circuit to provide the phase control signal Set at its first terminal, 202~20N are respectively configured as a slave control circuit to receive the phase control signal Set. FIG. 5B is a flowchart of a sequence assignment method used in the multiphase switching converter 200 in accordance with an embodiment of the present invention. It includes steps S221~S222.

In step S221, the master control circuit 201 generates the phase control signal Set, which includes a plurality of pulses, such as PULSE 1~PULSE N, for successively triggering the plurality of switching circuits 211~21N to provide power to the load. The master control circuit 201 modulates the pulses PULSE 1~PULSE N to generate a sequence information for each of the slave control circuits.

In step S222, the slave control circuits receive the phase control signal Set, wherein based on the received phase input signal and phase control signal Set, each of the slave control circuits obtains its own sequence information. Based on the sequence information, the slave control circuit could then generate the current threshold I_th, and compare the current indication signal I_load with the current threshold I_th to determine whether to enter the phase shedding mode.

FIG. 6A-6D show operation waveforms of the multiphase switching converter 200 under different signal modulation schemes in accordance with embodiments of the present invention. In the embodiment shown in FIG. 6A, PULSE 1~PULSE N in the phase control signal Set are modulated to have different pulse width, which can be expressed as $$t_{set\_on} = T_{SET} + j * T_{OFFSET} \quad (1)$$

wherein $T_{SET}$ is a preset pulse width, $T_{OFFSET}$ is an offset value, j=1, 2, . . . , N. Each of the slave control circuits 202 to 20N samples a pulse in the phase control signal Set based on its phase input signal, and obtain its sequence information in accordance with the pulse width of the sampled pulse. For example, the slave control circuit 202 samples the phase control signal Set based on its phase input signal Take2 to get PULSE 1, and then deduces j=1 based on the pulse width of PULSE 1 and Equation (1). Based thereupon, the slave control circuit 102 could get its sequence information, such as number "2", which indicates that the slave control circuit 202 belongs to the second phase.

Figure 6A:
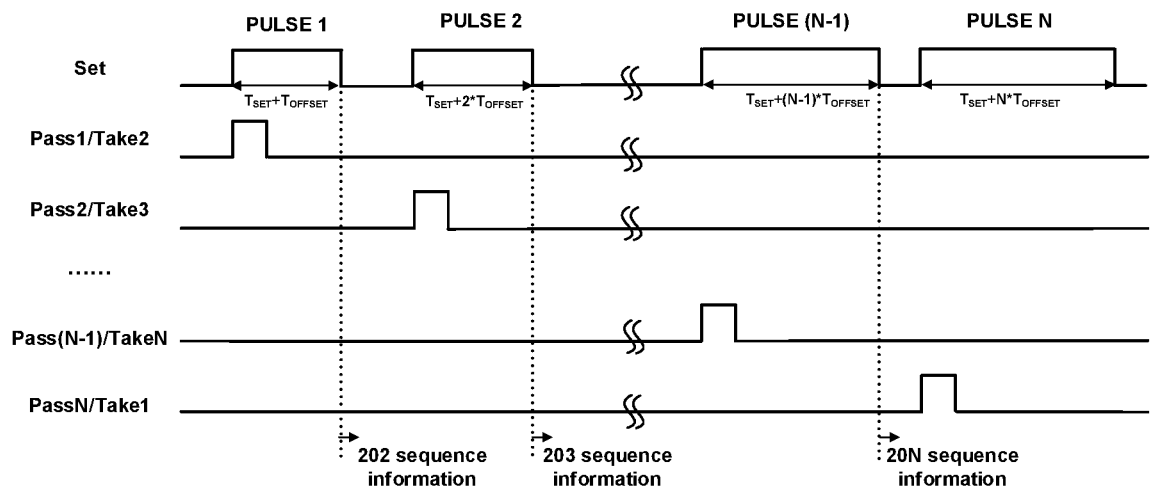
FIG. 6A-6D show operation waveforms of the multiphase switching converter 200 under different signal modulation schemes in accordance with embodiments of the present invention.

Although in the embodiment shown in FIG. 6A, the pulse width of PULSE 1~PULSE N are generated according to Equation (1), it could be understood by those skilled in the art that this is not intended to limit the invention. The pulse width of the pulses can be determined in other ways, as long as they are different from each other, and the corresponding sequence information can be resolved by the slave control circuits according to a predetermined relationship.

Figure 6B:
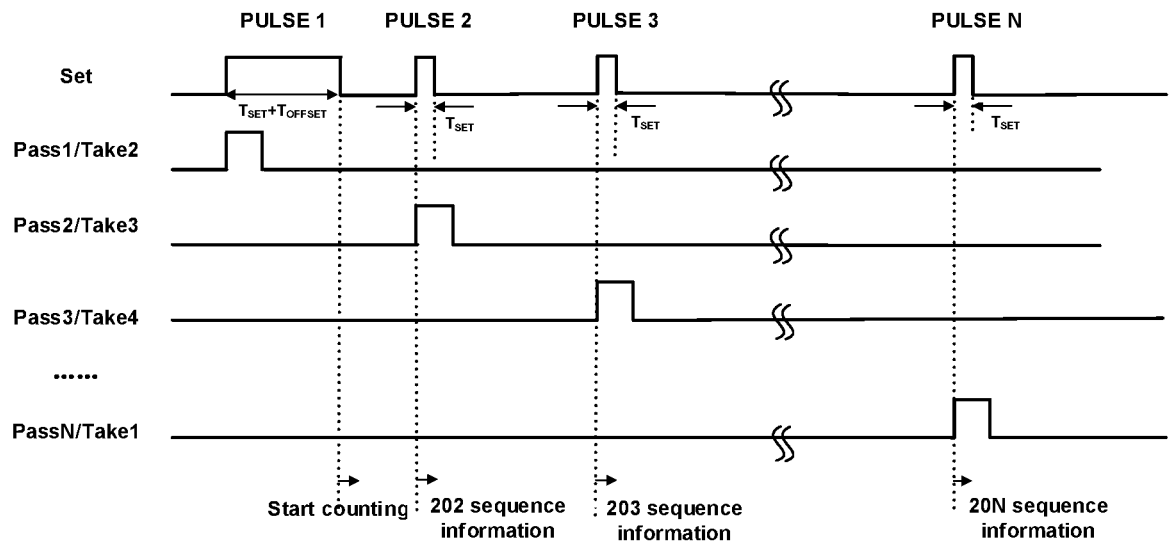

FIG. 6B illustrates a signal modulation scheme in accordance with another embodiment of the present invention. PULSE 1 in the phase control signal Set is modulated to have a pulse width different from the rest of pulses. For instance, the pulse width of PULSE 1 is set to ($T_{SET}$+ $T_{OFFSET}$), and the pulse width of PULSE 2~PULSE N are all set to $T_{SET}$. The slave control circuits 202 to 20N monitor the phase control signal Set, and start counting the pulses when PULSE 1 is detected. The sequence information is then obtained based on the phase input signal and count value. Take the slave control circuit 203 as an example, in one embodiment, the slave control circuit 203 monitors the pulse width of each pulse in the phase control signal Set, to determine whether it is greater than $T_{SET}$. When the pulse width is found to be larger than $T_{SET}$ at the falling edge of PULSE 1, counting is started. At the falling edge of PULSE 1, the count value is 0; at the rising edge of PULSE 2, the count value changes into 1. At the rising edge of PULSE 3, the count value becomes 2. Based on the phase input signal Take3, the slave control circuit 203 samples the count value (e.g., at the rising edge of the PULSE 3), to get a value such as 2. Then based on the sampled value, the sequence information of the slave control circuit 203 is obtained, for example, as number "3", which indicates the slave control circuit 203 belongs to the third phase.

Although in the embodiment of FIG. 6B, the pulse width of PULSE 1 is larger than that of the other pulses, it can be understood by those skilled in the art that this is not used to limit the invention. The pulse width of PULSE 1 could also be smaller than that of the other pulses, as long as PULSE 1 can be distinguished by the slave control circuits among the plurality of pulses.

Figure 6C:
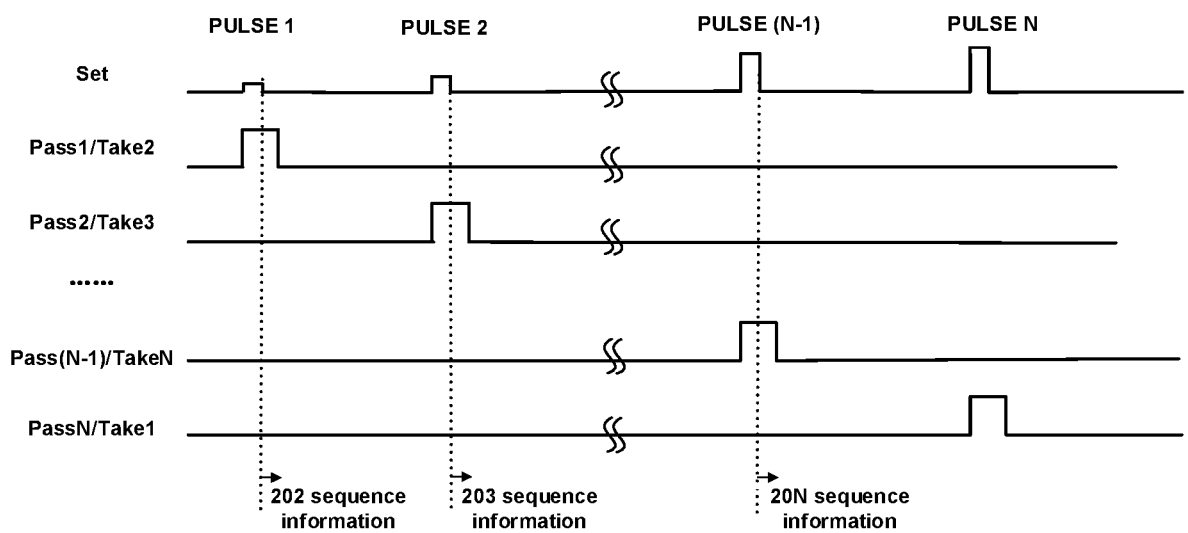
Figure 6D:
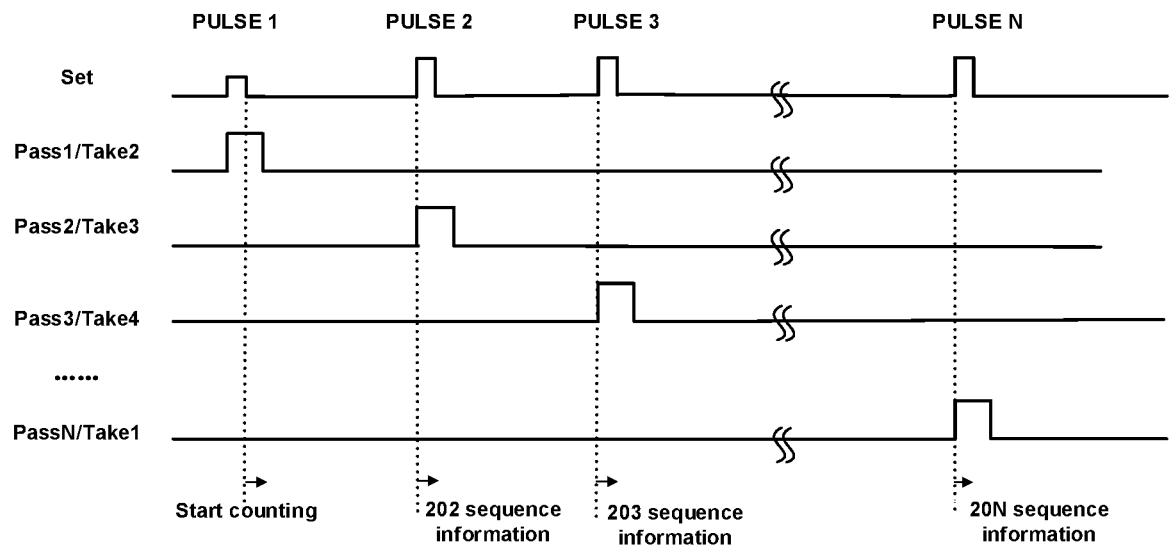

In addition to pulse width, pulse amplitude could also be modulated. For example, as shown in FIG. 6C, PULSE 1~PULSE N have different pulse amplitude from each other. One of them is sampled by the slave control circuit based on the phase input signal, and the sequence information is then obtained according to the pulse amplitude of the sampled pulse. Further as shown in FIG. 6D, PULSE 1 is modulated to have a pulse amplitude different from the other pulses, so that the slave control circuit can recognize it based on its pulse amplitude.

In the embodiments of FIG. 6A-6D, Take2 is synchronized with PULSE 1, Take3 is synchronized with PULSE 2, Take4 is synchronized with PULSE 3, . . . , Take1 is synchronized with PULSE N. It should be noted that, however, this is not intended to limit the invention. According to internal logic adopted by the control circuits, the signals Take1~TakeN can also be synchronized with PULSE 1~PULSE N sequentially and respectively, or have other phase relationship there between. In these cases, the sequence information can also be deduced from the phase control signal Set through ways similar to those shown in FIG. 6A-6D. These variations are easy to be understood by those skilled in the art, and therefore do not depart from the scope of the present invention.

Although modulation of the phase control signal in the master control circuit, and the sequence analysis based on the phase control signal in the slave control circuits can be carried out continuously and circularly, it is not absolutely necessary. In some embodiments, the multiphase switching converter has a normal operation mode and a sequence assignment mode. In normal operation mode, the pulses in the phase control signal output by the master control circuit have the same pulse width (such as the preset pulse width $T_{SET}$ in FIGS. 6A and 6B) and pulse amplitude. In the sequence assignment mode, the master control circuit modulates the pulse width or pulse amplitude of the pulses to generate the sequence information. The multiphase switching converter can enter the sequence assignment mode when it is just powered or in other necessary situations.

Figure 7A:
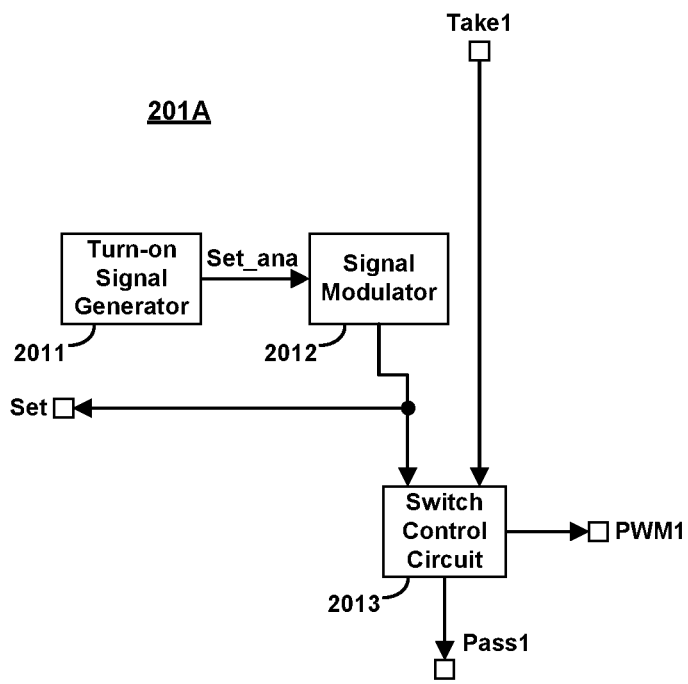
FIG. 7A is a schematic block diagram of a master control circuit 201A in accordance with an embodiment of the present invention.

FIG. 7A is a schematic block diagram of a master control circuit 201A in accordance with an embodiment of the present invention. It includes a turn-on signal generator 2011, a signal modulator 2012 and a switch control circuit 2013. The turn-on signal generator 2011 generates a turn-on control signal Set_ana. The signal modulator 2012 is coupled to the turn-on signal generator 2011 to receive the turn-on control signal Set_ana, and configured to generate the phase control signal Set based thereupon. The switch control circuit 2013 is coupled to the signal modulator 2012, and is configured to generate the switch control signal PWM1 and the phase output signal Pass1 based on the phase control signal Set and the phase input signal Take1. The turn-on control signal Set_ana can be generated through comparing the output voltage Vout of the multiphase switching converter with a reference signal. It could also be a periodical clock signal produced by an oscillator.

Figure 7B:
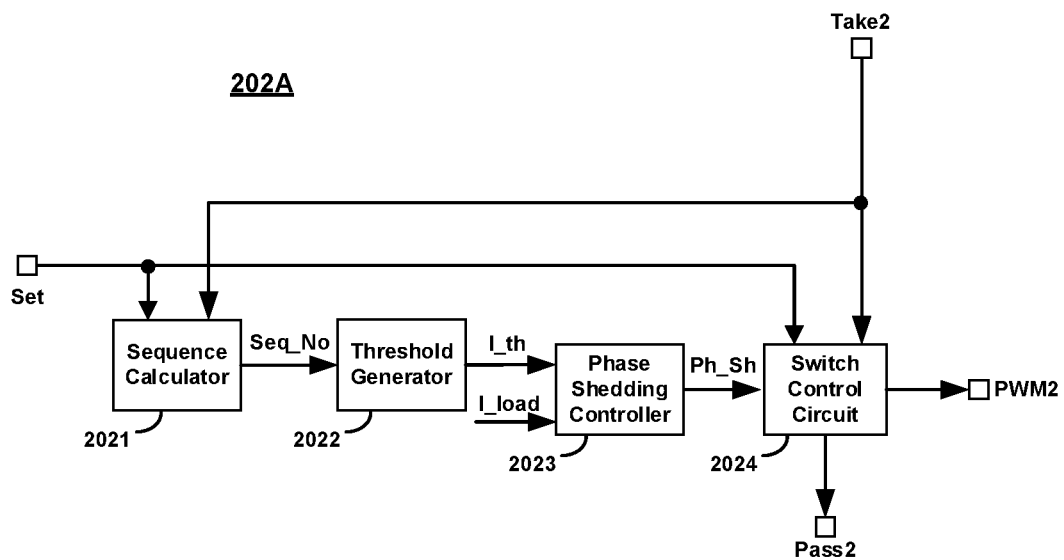
FIG. 7B is a schematic block diagram of a slave control circuit 202A in accordance with an embodiment of the present invention.

FIG. 7B is a schematic block diagram of a slave control circuit 202A in accordance with an embodiment of the present invention. It includes a sequence calculator 2021, a threshold generator 2022, a phase shedding controller 2023 and a switch control circuit 2024. The sequence calculator 2021 obtains the sequence information Seq_No based on the phase control signal Set and the phase input signal Take2. The threshold generator 2022 is configured to generate the current threshold I_th based on the sequence information Seq_No.

The phase shedding controller 2023 is coupled to the threshold generator 2022, and is configured to compare the current indication signal I_load with the current threshold I_th to generate a phase shedding control signal Ph_Sh for controlling the switch control circuit 2024. The switch control circuit 2024 generates the switch control signal PWM2 and the phase output signal Pass2 based on the phase control signal Set, the phase input signal Take2 and the phase shedding control signal Ph_Sh.

Figure 8:
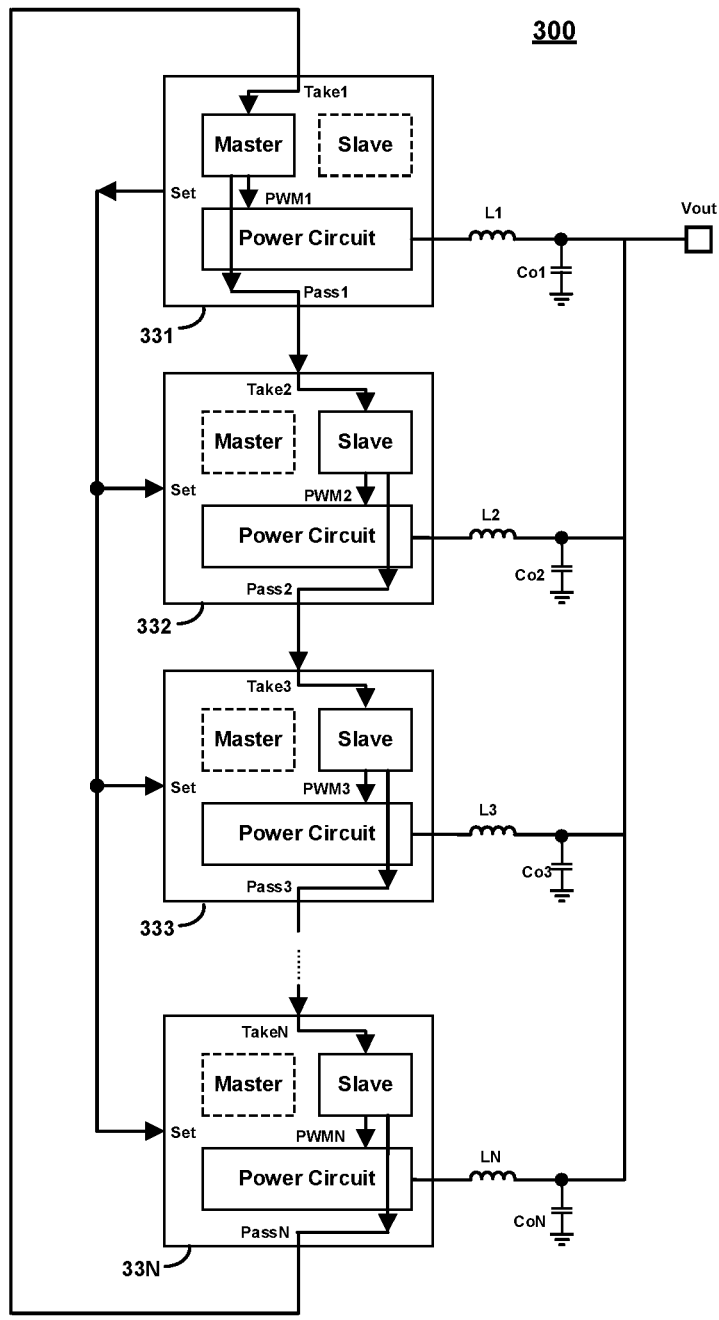
FIG. 8 is a schematic block diagram of a multiphase switching converter 300 in accordance with an embodiment of the present invention.

FIG. 8 is a schematic block diagram of a multiphase switching converter 300 in accordance with an embodiment of the present invention. It includes control ICs 331~33N with same internal structure. Each control IC integrates a master control circuit, a slave control circuit and a power circuit, wherein either the master control circuit or the slave control circuit is selectively enabled. For example, in the embodiment shown in FIG. 8, the control IC 331 is configured as a master control IC. Its master control circuit is enabled and its slave control circuit is disabled. Accordingly, the control ICs 332 to 33N are configured as slave control ICs, with their slave control circuits enabled and master control circuits disabled. The power circuit inside the control IC may include transistors and corresponding driver circuit, as shown in FIG. 5A. Of course, in some embodiments, the power circuit could also be located outside of the control IC.

The master control circuit and slave control circuit in the control IC of FIG. 8 could adopt structures respectively similar to those shown in FIGS. 7A and 7B. However, to save circuit area and simplify circuit structure, the master control circuit and slave control circuit can reuse some functional blocks, e.g., the switch control circuit. Moreover, there are many ways to configure the control IC as a master control IC or as a slave control IC. For instance, this configuration could be realized through adjusting voltage, current or resistance value of certain pins of the control IC.

Figure 9:
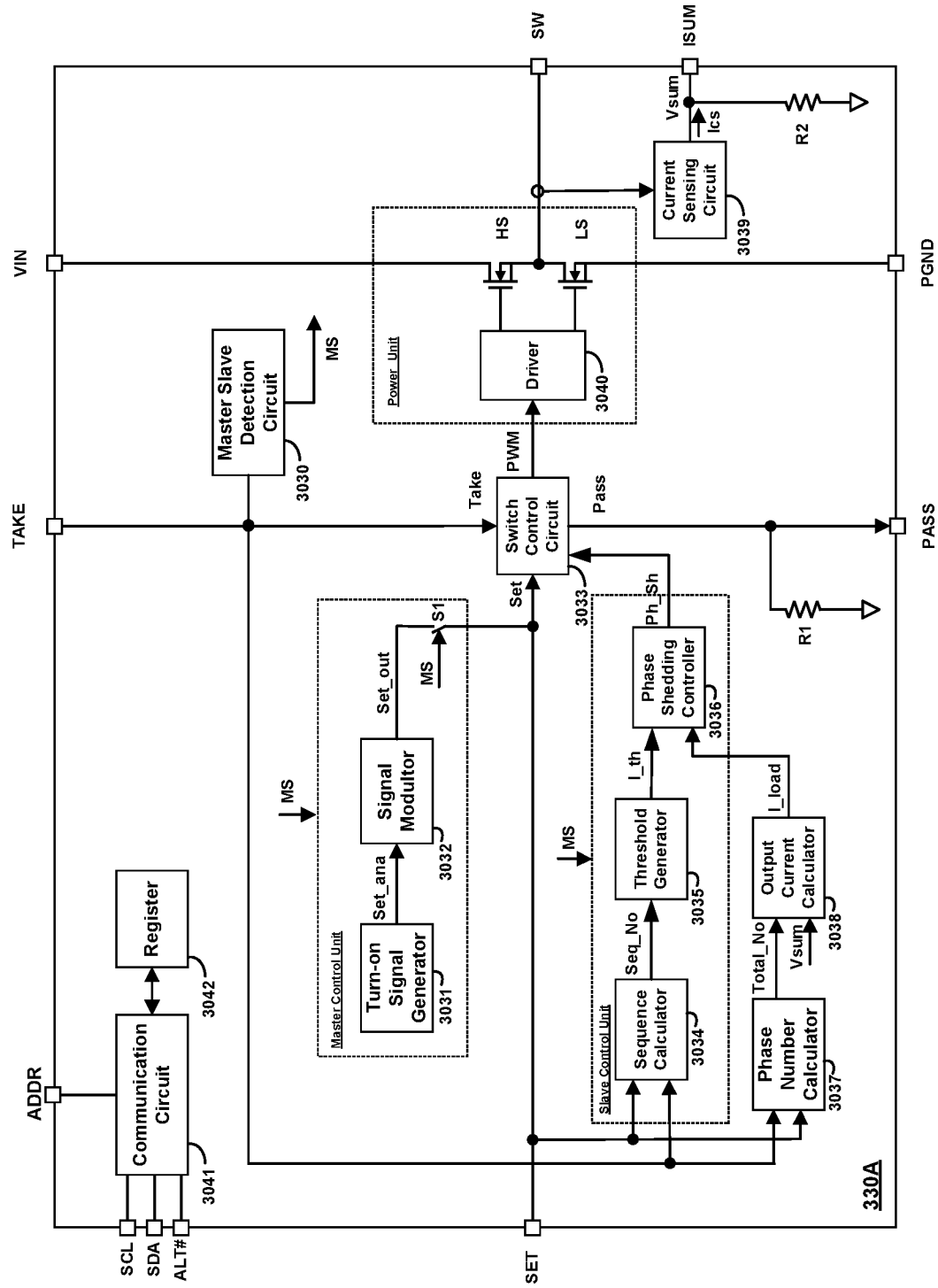
FIG. 9 is a schematic block diagram of a control IC 330A used in a multiphase switching converter in accordance with an embodiment of the present invention.

FIG. 9 is a schematic block diagram of a control IC 330A used in a multiphase switching converter in accordance with an embodiment of the present invention. The control IC 330A includes a master control unit, a slave control unit, a power unit, a master slave detection circuit 3030, a switch control circuit 3033 and a plurality of pins. Pin SET is configured to share a phase control signal Set, pin TAKE is configured to receive a phase input signal Take, pin PASS is configured to provide a phase output signal Pass, pin VIN is configured to receive an input voltage Vin, pin PGND is configured to be couple to a power ground, and pin SW is configured to be coupled to a load through one or more external components.

The master control unit is configured to generate the phase control signal Set. The slave control unit is configured to obtain the sequence information Seq_No based on the phase input signal Take and the phase control signal Set, generate the current threshold I_th in accordance with the sequence information, and then compare the current indication signal I_load with the current threshold I_th to provide the phase shedding control signal Ph_Sh to the switch control circuit 3033. The power unit includes transistors HS and LS as well as a driver circuit 3040. The transistors HS and LS are coupled in series between pins VIN and PGND, and the connection node of transistors HS and LS is connected to pin SW. Based on the phase control signal Set, the phase input signal Take and the phase shedding control signal Ph_Sh, the switch control circuit 3033 generates the phase output signal Pass, and the switch control signal PWM for controlling the transistors HS and LS. The master slave detection circuit 3030 determines whether the control IC is configured as a master control IC or a slave control IC, and generates a master slave detection signal MS to control the master control unit and the slave control unit.

In one embodiment, the master control unit includes a turn-on signal generator 3031, a signal modulator 3032 and a switch 51. The turn-on signal generator 3031 is configured to generate a turn-on control signal Set_ana. The signal modulator 3032 is coupled to the turn-on signal generator 3031, and configured to generate a preprocess signal Set_out based on the turn-on control signal Set_ana. The switch 51 has a first terminal, a second terminal and a control terminal, wherein the first terminal is coupled to the signal modulator 3032 to receive the preprocess signal Set_out, the second terminal is coupled to pin SET, and the control terminal is coupled to the master slave detection circuit 3030 to receive the master slave detection signal MS.

The slave control unit includes a sequence calculator 3034, a threshold generator 3035 and a phase shedding controller 3036. The sequence calculator 3034 is coupled to pins TAKE and SET to receive the phase input signal Take and the phase control signal Set, and is configured to obtain the sequence information Seq_No based on these two signals. The threshold generator 3035 is configured to generate the current threshold I_th based on the sequence information Seq_No. The phase shedding controller 3036 is coupled to the threshold generator 3035, and is configured to compare the current indication signal I_load with the current threshold I_th, to generate a phase shedding control signal Ph_Sh for controlling the switch control circuit 3033.

In one embodiment, the control IC 330A further includes a pull-down resistor R1 coupled between the pin PASS and the reference ground. In daisy chain architecture, the control IC 330A can be configured as a master control IC by connecting the pin TAKE to a power supply voltage Vcc through an external pull-up resistor. Alternatively, without such an external pull-up resistor connected to pin TAKE, the control IC 330A is configured as a slave control IC. When the control IC 330A is just powered on, it will set the pin PASS to a high-impedance state for a period of time. And during this time period, the master slave detection circuit 3030 monitors the voltage at the pin TAKE to determine whether the control IC is configured as a master control IC or a slave control IC. If the voltage at the pin TAKE is high, the control IC is set as a master control IC, else if the voltage at the pin TAKE is low, the control IC is set as a slave control IC.

In some embodiments, the control IC 330A could further include a total phase number calculator 3037, an output current calculator 3038, a current sensing circuit 3039 and pin ISUM. Based on the phase input signal Take and the phase control signal Set, the total phase number calculator 3037 obtains the total phase number, Total_No, of the multiphase switching converter. For example, the total phase number calculator 3037 can count the number of pulses in the phase control signal Set during one period of the phase input signal Take to get the total phase number. The current sensing circuit 3039 is coupled to the pin SW, and is configured to sense the current flowing through the pin SW to generate a sensing current Ics. This sensing current Ics is provided to the pin ISUM. A resistor R2 is coupled between the pin ISUM and the reference ground.

The ISUM pins of all the control ICs in the daisy chain are coupled together, to provide an average current sensing signal Vsum which is indicative of an average output current of the multiphase switching converter.

$$Vsum = \frac{(Ics1 + Ics2 + \ldots + IcsN) * R2}{N} \quad (2)$$

The output current calculator 3038 is coupled to the total phase number calculator 3037 and pin ISUM, and is configured to generate the current indication signal I_load based on the total phase number Total_No and the average current sensing signal Vsum. This current indication signal I_load represents the output current Iout of the multiphase switching converter as well as the current flowing through the load, and could be expressed as:

$$I\_load = Total\_No * Vsum \quad (3)$$

In some embodiments, the control IC 330A further includes a communication circuit 3041 and a register circuit 3042. The communication circuit 3041 is coupled to a communication bus, such as I$^2$C, SPI, SCI, UART, or other commonly used buses. PMBUS or SMBUS protocol can be adopted when I$^2$C bus is used. In one embodiment, this communication bus is an I$^2$C bus with PMBUS protocol. The control IC 330A further includes pins SCL, SDA, ALT for data communication, and pin ADDR for setting communication address of the control IC 330A. The register circuit 3042 is used to store data, such as instructions or commands from a host controller, intermediate or final data of digital calculation, and addresses, etc.

Figure 10:
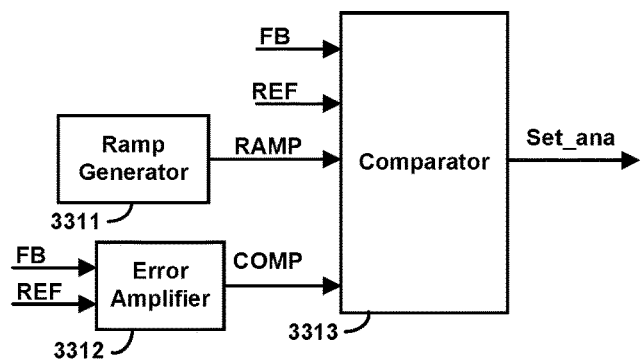
FIG. 10 is a schematic block diagram of a turn-on signal generator 3031A in accordance with an embodiment of the present invention.

FIG. 10 is a schematic block diagram of a turn-on signal generator 3031A in accordance with an embodiment of the present invention. The turn-on signal generator 3031A includes a ramp generator 3311, an error amplifier 3312 and a comparator 3313. The ramp generator 3311 is configured to provide a ramp signal RAMP. The error amplifier 3312 receives a reference signal REF and a feedback signal FB indicative of the output voltage Vout of the multiphase switching converter, and generates a compensation signal COMP based on these two signals. The comparator 3313 receives the feedback signal FB, the reference signal REF, the ramp signal RAMP and the compensation signal COMP, and generates the turn-on control signal Set_ana.

Figure 11:
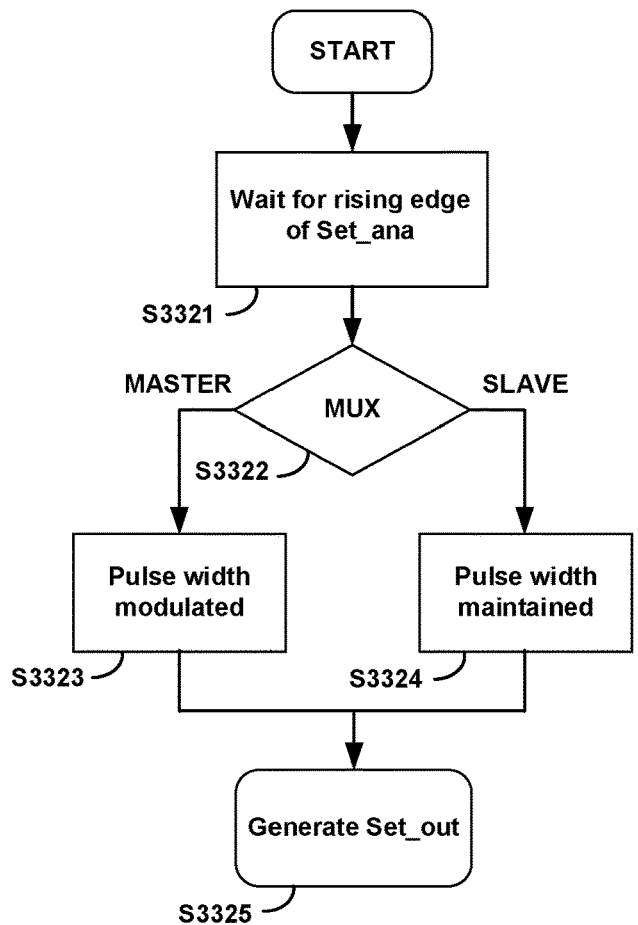
FIG. 11 is a working flowchart of the signal modulator 3032 in accordance with an embodiment of the present invention.

FIG. 11 is a working flowchart of the signal modulator 3032 in accordance with an embodiment of the present invention. It includes steps S3321 to S3325. In step S3321, the signal modulator 3032 waits for a rising edge of the turn-on control signal Set_ana, and enters into step S3322 once the rising edge is detected. In step S3322, it is determined whether the control IC is set as a master control IC or a slave control IC. If the control IC is set as a master control IC, the process will proceed to step S3323. The pulse width of the turn-on control signal Set_ana will be modulated (for example, in the way shown in FIG. 6B), to generate the preprocess signal Set_out in step S3325. If the control IC is set as a slave control IC, the process will go to step S3324, wherein the pulse width of the turn-on control signal Set_ana is kept unchanged, and the preprocess signal Set_out with its pulse width same with the turn-on control signal Set_ana is generated in step S3325.

Figure 12A:
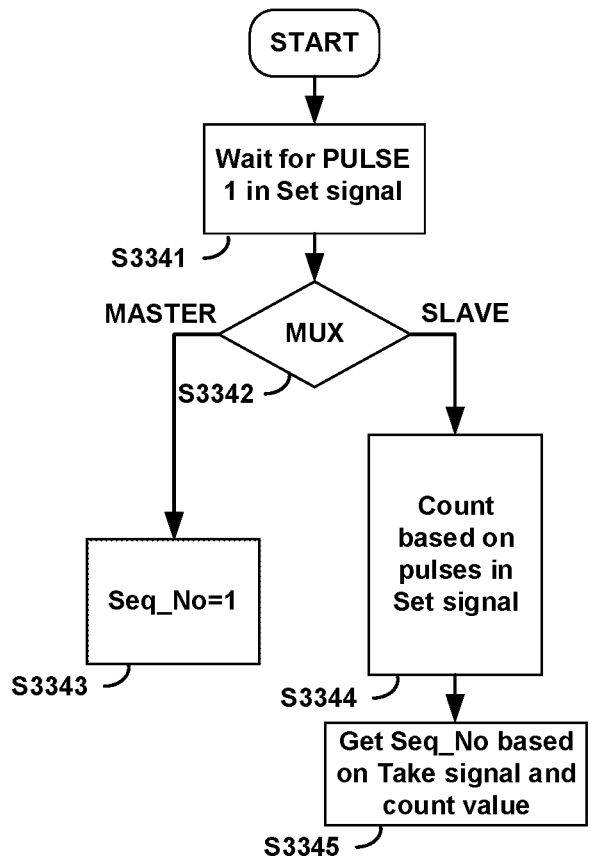
FIG. 12A is a working flowchart of the sequence calculator 3034 in accordance with an embodiment of the present invention.

FIG. 12A is a working flowchart of the sequence calculator 3034 in accordance with an embodiment of the present invention. It includes steps S3341 to S3345. In step S3341, the sequence calculator 3034 waits for PULSE 1 in the phase control signal Set, and enters into step S3342 once PULSE 1 is detected. In step S3342, it is determined whether the control IC is set as a master control IC or a slave control IC. If the control IC is configured as a master control IC, the process will go to step S3343 and set Seq_No to "1". Else if the control IC is configured as a slave control IC, the process will go to step S3344 and start counting based on pulses in the phase control signal Set. Then, in step S3345, the Seq_No is obtained based on the phase input signal Take and a count value.

Figure 12B:
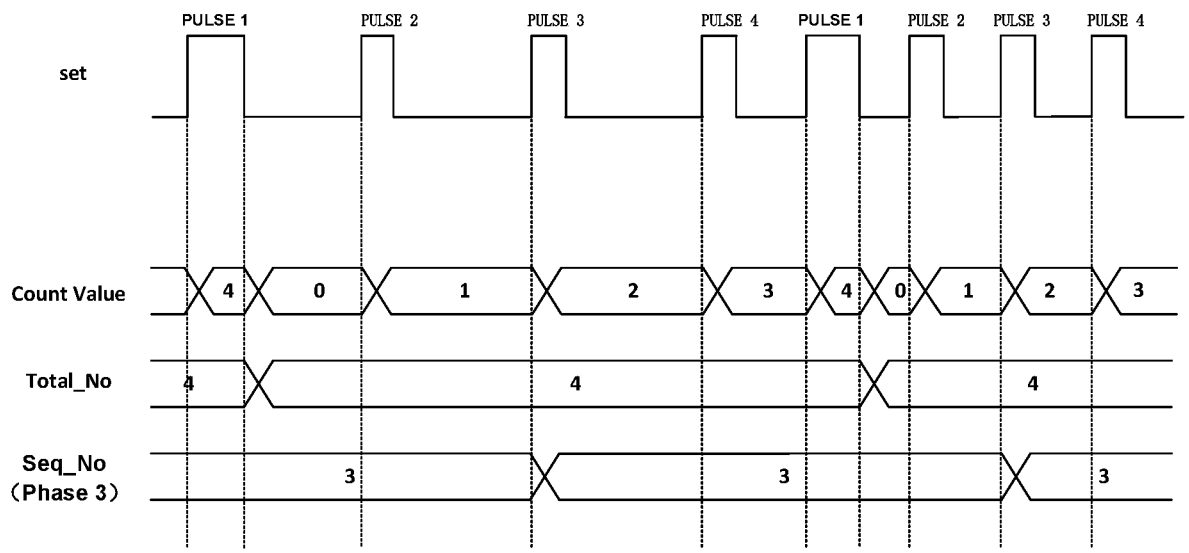
FIG. 12B show operation waveforms of the sequence calculator 3034 in a four-phase switching converter in accordance with an embodiment of the present invention.

FIG. 12B show operation waveforms of the sequence calculator 3034 in a four-phase switching converter in accordance with an embodiment of the present invention, wherein the control IC is used in the third phase, and its corresponding Seq_No is 3. As can be seen from FIG. 12B, through counting the pulses in the phase control signal Set, not only the sequence information, but also the total phase number of the switching converter could be obtained.

Figure 13:
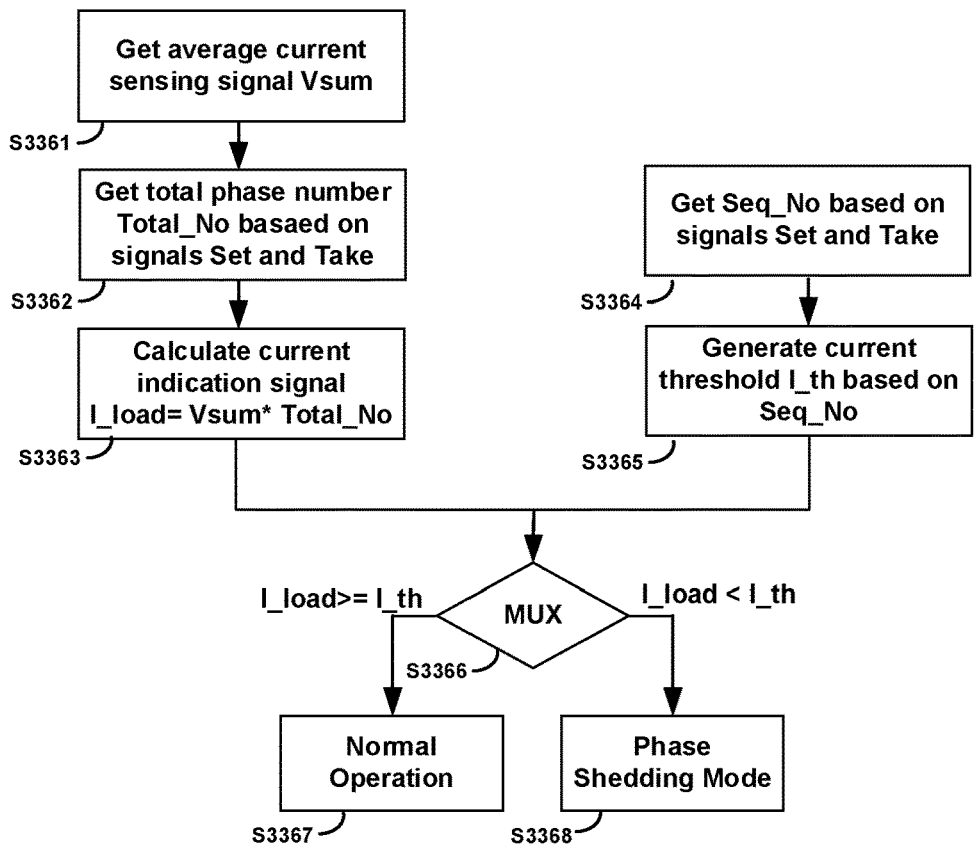
FIG. 13 is a working flowchart of a phase shedding control method used in the control IC 330A in accordance with an embodiment of the present invention.

FIG. 13 is a working flowchart of a phase shedding control method used in the control IC 330A in accordance with an embodiment of the present invention. It includes steps S3361 to S3368. In step S3361, the average current sensing signal Vsum is obtained. In step S3362, the total phase number Total_No is calculated based on the phase control signal Set and the phase input signal Take. In step S3363, the current indication signal I_load is calculated according to the equation (3). In step S3364, the sequence information Seq_No is obtained based on the phase control signal Set and the phase input signal Take. In step S3365, the current threshold I_th is generated based on the sequence information Seq_No. In step S3366, the current indication signal I_load is compared with the current threshold I_th. If the current indication signal I_load is greater than or equal to the current threshold I_th, the process will proceed to step S3367, and the control IC will work normally. Else if the current indication signal I_load is less than the current threshold I_th, the process will proceed to step S3368, wherein the control IC enters the phase shedding mode.

In some embodiments, to ensure safe operation of the multiphase switching converter, phase shedding mode of the master control IC is blocked. That is, the master control IC will not enter the phase shedding mode in any case.

Figure 14:
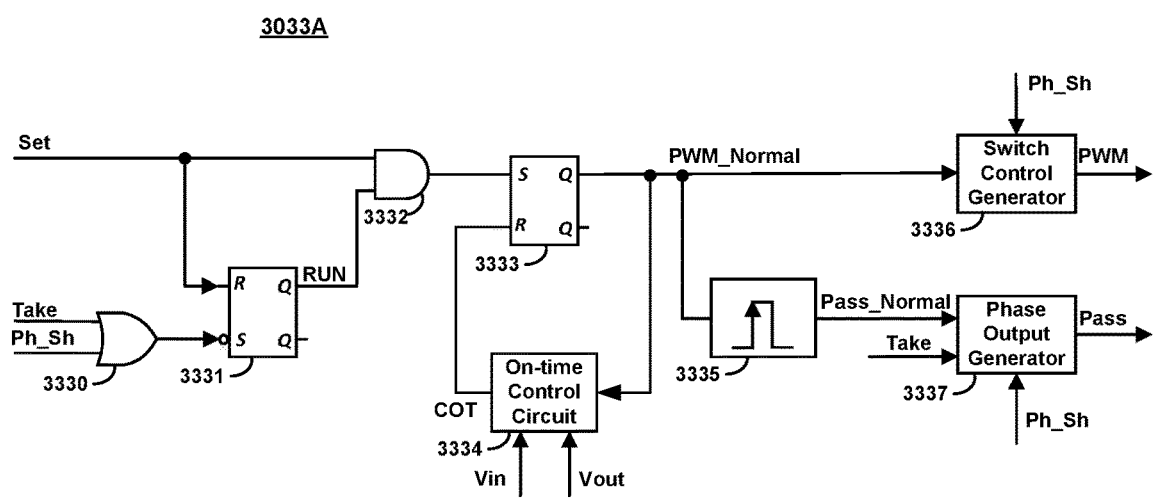
FIG. 14 is a schematic block diagram of a switch control circuit 3033A in accordance with an embodiment of the present invention.

FIG. 14 is a schematic block diagram of a switch control circuit 3033A in accordance with an embodiment of the present invention. The switch control circuit 3033A includes an OR gate 3330, RS flip-flops 3331, 3333, an AND gate 3332, an on-time control circuit 3334, a one-shot circuit 3335, a switch control generator 3336 and a phase output generator 3337. In this embodiment, a constant on-time control method is adopted. Under normal operation, at the falling edge of the phase input signal Take, the flip-flop 3331 is set and its output signal RUN is changed into logical high. After that, when the phase control signal Set changes from logical low into logical high, the flip-flop 3333 is set and its output signal PWM_Normal is changed into logical high. At the same time, the signal Pass_Normal also becomes high. The flip-flop 3333 will be reset by the on-time control circuit 3334 after a time period TON. This time period is usually determined by the input voltage Vin and output voltage Vout of the multiphase switching converter.

The switch control generator 3336 generates the switch control signal PWM based on the signal PWM_Normal and the phase shedding control signal Ph_Sh. Under normal operation, the switch control signal PWM is equal to PWM_Normal. In the phase shedding mode, the switch control signal PWM is set to a high impedance state, and both the transistors HS and LS are off.

Figure 15:
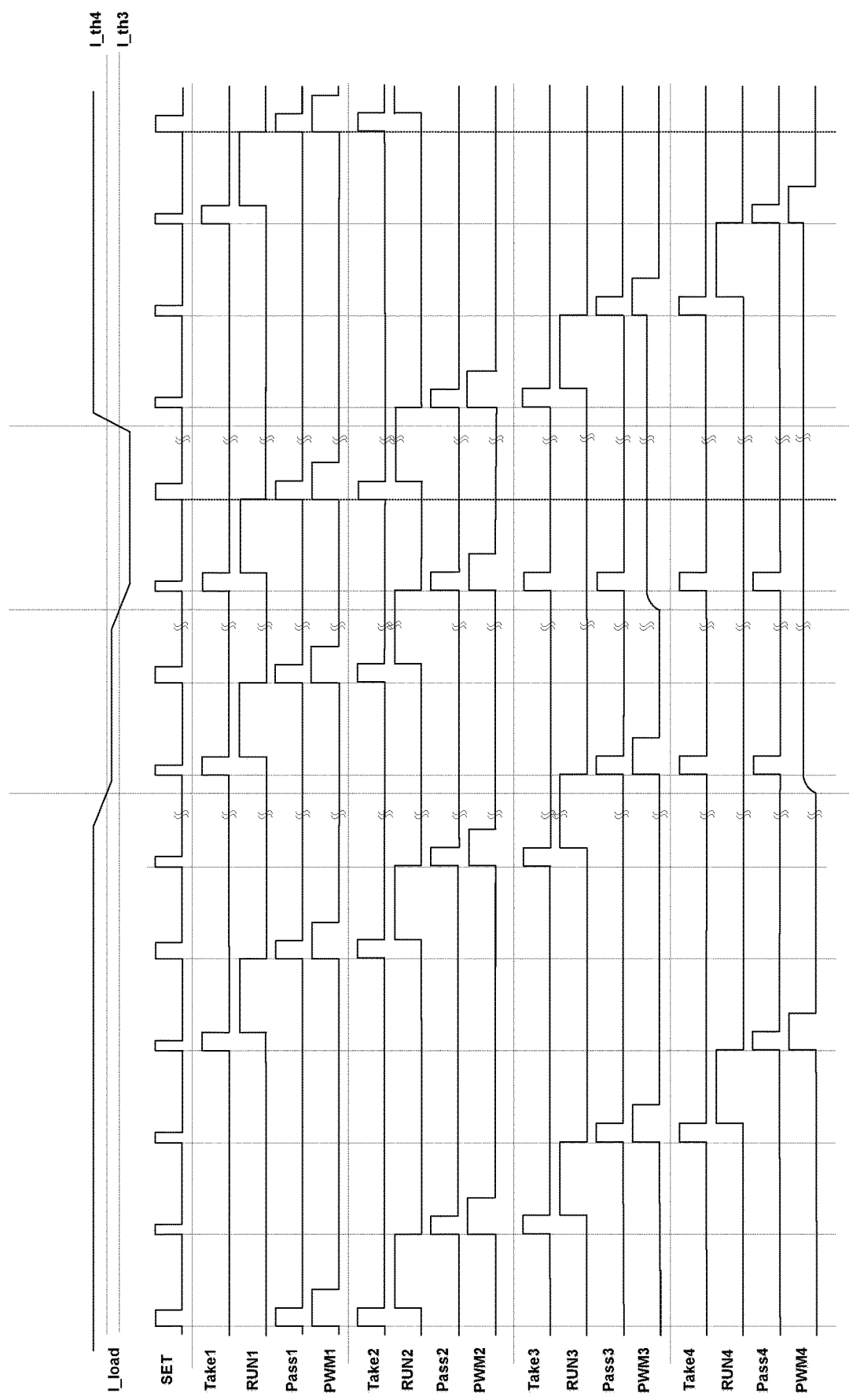
FIG. 15 show operation waveforms of a four-phase switching converter in accordance with an embodiment of the present invention.

The phase output generator 3337 generates the phase output signal Pass based on the signal Pass_Normal, the phase input signal Take and phase shedding control signal Ph_Sh. Under normal operation, the phase output signal Pass is equal to Pass_Normal. In the phase shedding mode, the phase output signal Pass is equal to the phase input signal Take. FIG. 15 show operation waveforms of a four-phase switching converter in accordance with an embodiment of the invention, wherein logic signals in the control ICs and their state changes in the phase shedding mode are all illustrated.

Although switching circuits are all configured in synchronous BUCK in the foregoing embodiments, it can be understood by those skilled in the art that, the switching circuit can also adopt other topologies, such as asynchronous BUCK, BOOST, BUCK-BOOST, etc. The transistors contained therein could also use other suitable controllable semiconductor transistors, besides MOSFET. These transistors can be discrete devices, or integrated together with the corresponding control circuit and driver circuit. In some applications, inductors and capacitors in switching circuits can also be integrated. Moreover, the switch control circuit can adopt control methods other than the constant on time control. These modifications are easy to be understood by people of ordinary skills in the art, thus do not depart from the scope of the present invention.

Figure 16:
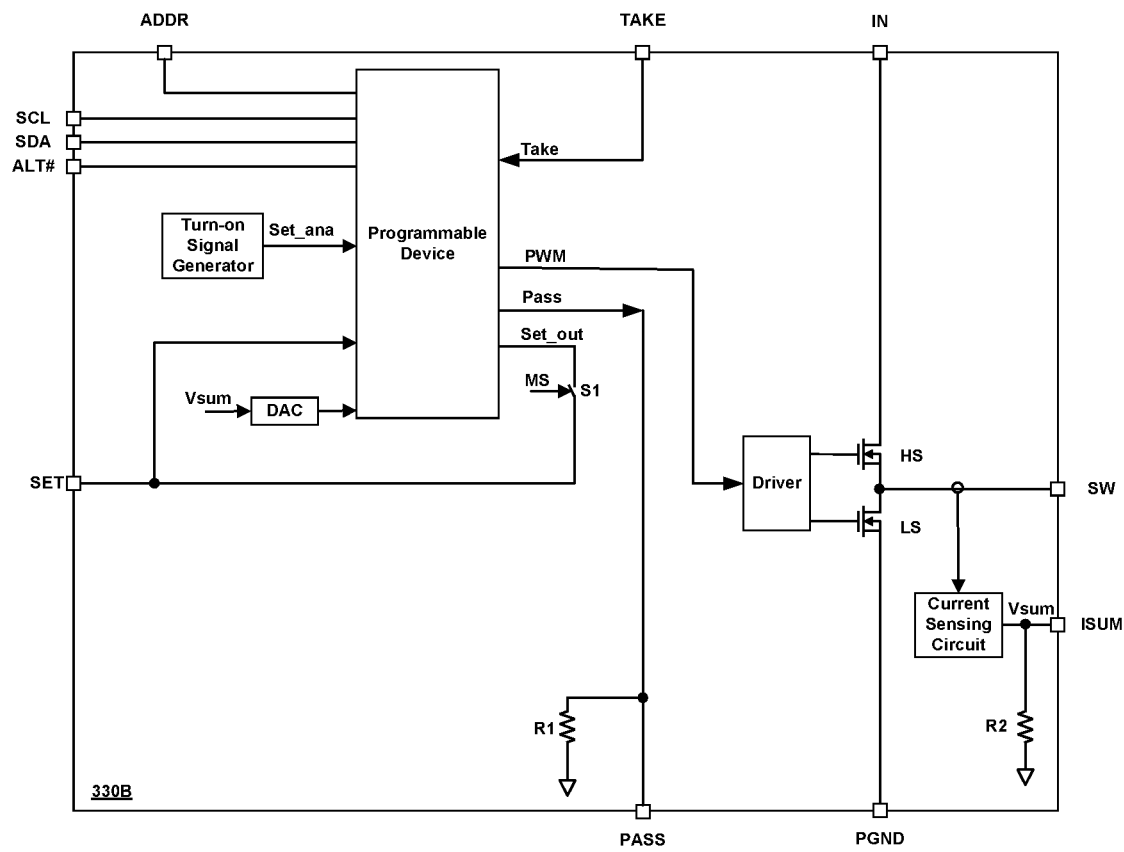
FIG. 16 is a schematic block diagram of a control IC 330B used in a multiphase switching converter in accordance with an embodiment of the present invention.

Moreover, for ease of description, the control circuit in the aforementioned embodiments is divided and illustrated in functional blocks, but this is not used to limit the invention. Some of the blocks in the control circuit, such as the turn-on signal generator 2011 and the signal modulator 2012 in the embodiment shown in FIG. 7A, may be implemented by discrete devices or chips. Some blocks may be partially combined and realized by digital signal processing circuits or programmable devices (e.g. PLA, PAL, GAL, EPLD, CPLD, FPGA, etc.). FIG. 16 is a schematic block diagram of a control IC 330B used in a multiphase switching converter in accordance with an embodiment of the present invention. Compared with the embodiment of FIG. 9, the programmable device in FIG. 16 realizes functions of the master slave detection circuit, the signal modulator, the switch control circuit, the sequence calculator, the threshold generator, the phase shedding controller, the total phase number calculator, the output current calculator, the communication circuit and the register circuit.

Figure 17:
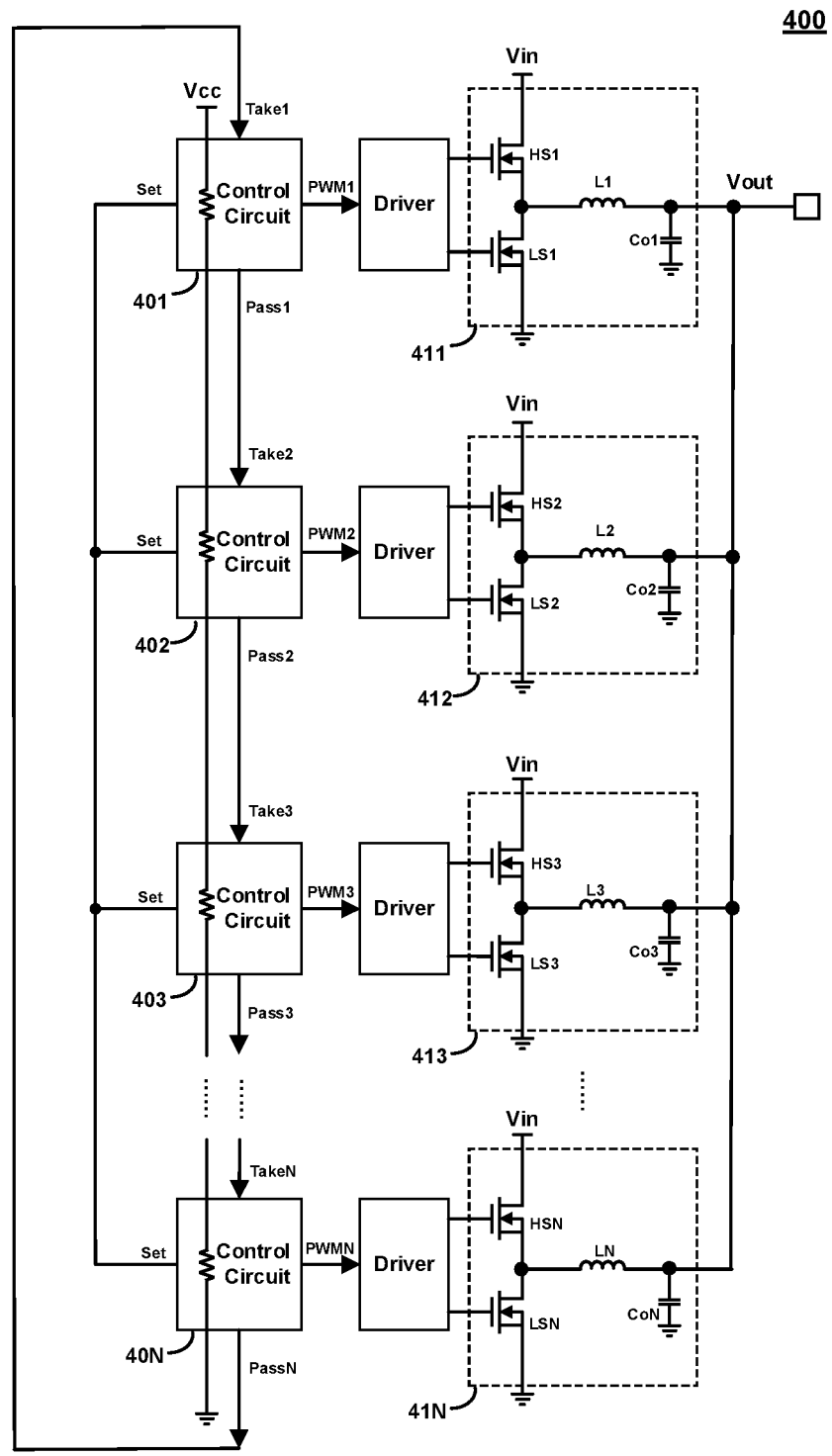
FIG. 17 is a schematic block diagram of a multiphase switching converter 400 in accordance with an embodiment of the present invention.

Although the scheme of modulating the phase control signal in the master control circuit and analyzing the phase control signal to obtain the sequence information in the slave control circuits are detailed introduced above, it is not intended to limit the present invention. Other suitable sequence information acquiring methods could also be adopted. For instance, in the embodiment shown in FIG. 17, each control circuit has a resistor. These resistors have same resistance, and are serially coupled between a power supply voltage Vcc and a reference ground. Each control circuit could calculate its sequence information based on a voltage VH at a higher end of the resistor in the control circuit, and a voltage VL at a lower end of the resistor.

$$\text{Seq\_No} = +\frac{Vcc - VH}{VH - VL} 1 \qquad (4)$$

Figure 18:
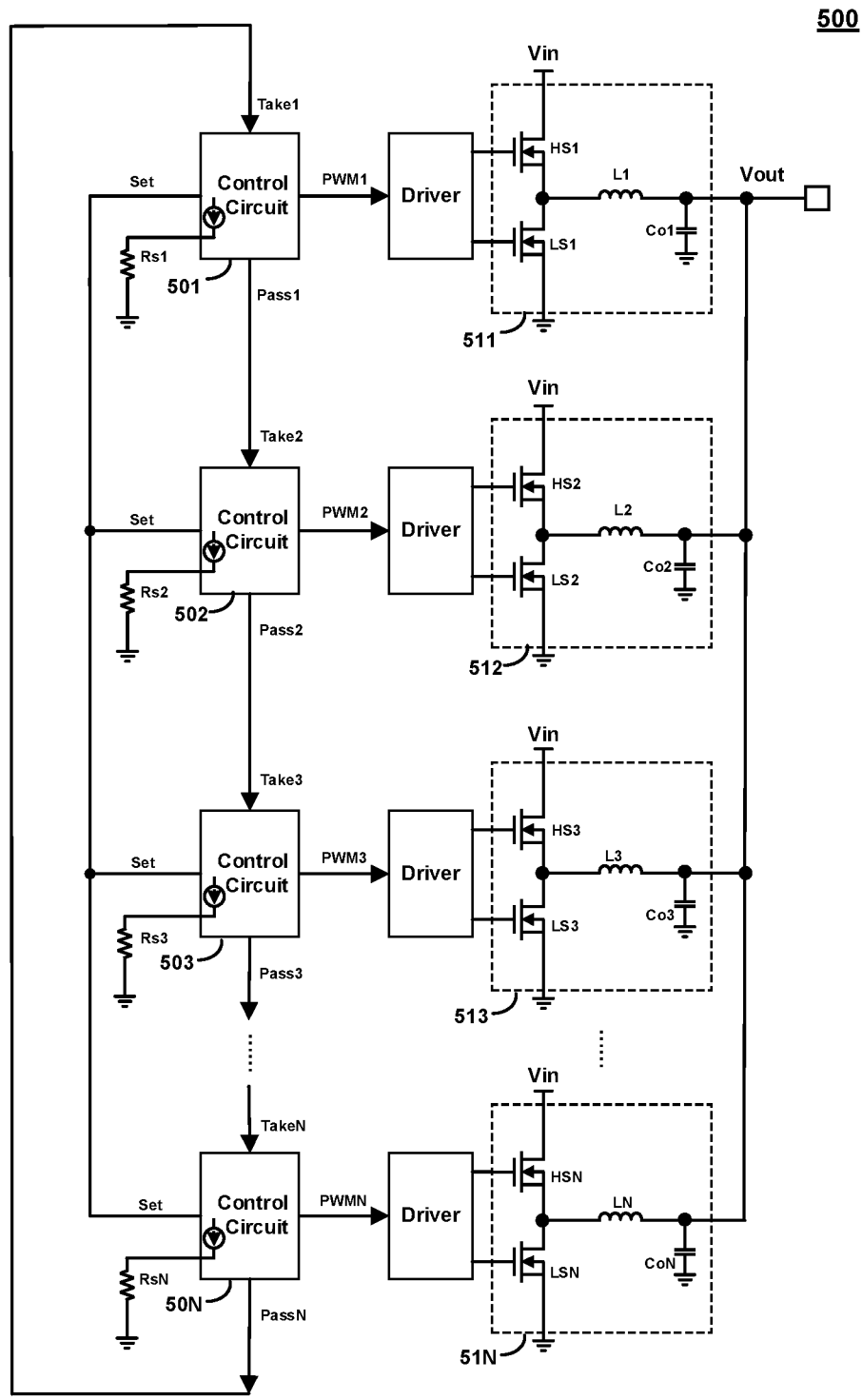
FIG. 18 is a schematic block diagram of a multiphase switching converter 500 in accordance with an embodiment of the present invention.

FIG. 18 is a schematic block diagram of a multiphase switching converter 500 in accordance with an embodiment of the present invention, wherein each control circuit has a specific pin for sequence setting, and a current source for providing a current to the pin. Resistors Rs1~Rsn with different resistance are respectively coupled between the pin of one control circuit and a reference ground. Based on the voltage on the pin, the control circuit could obtain its sequence information through calculation, look-up table or other suitable ways.

Furthermore, people of ordinary skills in the art could realize that, in practical applications, a hysteresis is often adopted in the comparison between the current indication signal I_load and the current threshold I_th. A phase adding threshold Ith_add and a phase shedding threshold Ith_shed could be generated based on the current threshold I_th. The control circuit will enter into the phase shedding mode if the current indication signal I_load is lower than Ith_shed, and will enter into normal operation if the current indication signal I_load is greater than or equal to Ith_add. If the current indication signal I_load is between Ith_shed and Ith_add, the control circuit will maintain its original working mode.

In some embodiments, Ith_add=I_th+1_hys, Ith_shed=I_th−I_hys, wherein 1_hys is a hysteresis value. In some other embodiments, Ith_add=I_th, Ith_shed=I_th−I_hys. While in still other embodiments, Ith_add=I_th+1_hys, Ith_shed=I_th.

In addition, to avoid mis-trigger, the control circuit, in some exemplary embodiments, enters the phase shedding mode only when the current indication signal I_load is detected to be lower than Ith_shed for a continuous time period.

In some of the foregoing embodiments, the switch control signal changes to a high impedance state in the phase shedding mode. When detecting this high impedance state, the driver circuit turns off transistors in the corresponding switching circuit to stop providing power to the load. People of ordinary skills can recognize that, however, other suitable ways could also be used to disable the corresponding switching circuit. Furthermore, when the switching circuit gets disabled, the transistors in the switching circuit do not have to be turned off simultaneously. For a synchronous BUCK, the high side transistor can be turned off first, and the low side transistor can be turned off later, e.g. when a zero cross of inductor current is detected.

In some embodiments, a voltage level between a threshold voltage Vth1 (e.g. 2V) and a power supply voltage Vcc (e.g. 3.3V) is considered as logical high ("1"), a voltage level between zero voltage (0 V) and a threshold voltage Vth2 (e.g. 1V) is considered as logical low ("0"), and a voltage level between the threshold voltage Vth2 and Vth1 is considered as an intermediate level. A high impedance state refers to an output state of a digital circuit, which is neither logical high nor logical low. If this high impedance state is provided to a downstream circuit, its voltage level will be wholly determined by the downstream circuit, thus might be any of the logical high, logical low and intermediate levels.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit used in a multiphase switching converter, wherein the multiphase switching converter includes a plurality of switching circuits coupled in parallel, and a plurality of control circuits configured in a daisy chain, the control circuit comprises:
    a first terminal configured to share a phase control signal with the rest of the plurality of control circuits;
    a second terminal configured to receive a phase input signal from a previous control circuit in the daisy chain; and
    a third terminal configured to provide a phase output signal to a latter control circuit in the daisy chain; wherein
    based on the phase input signal and phase control signal, the control circuit generates the phase output signal, and a switch control signal for controlling a corresponding one of the plurality of switching circuits; and wherein
    the control circuit generates a current threshold based on a sequence information, and compares a current indication signal indicative of a load current of the multiphase switching converter with the current threshold to determine whether to enter into a phase shedding mode.

2. The control circuit of claim 1, wherein a phase adding threshold and a phase shedding threshold are generated based on the current threshold and are compared with the current indication signal, and wherein the control circuit enters into the phase shedding mode when the current indication signal is lower than the phase shedding threshold, and resumes to normal operation when the current indication signal becomes larger than the phase adding threshold.

3. The control circuit of claim 1, further comprising:
    a sequence calculator configured to obtain the sequence information of the control circuit;
    a threshold generator coupled to the sequence calculator to receive the sequence information, and configured to generate the current threshold based on the sequence information;
    a phase shedding controller coupled to the threshold generator, and configured to compare the current indication signal with the current threshold to generate a phase shedding control signal; and
    a switch control circuit coupled to the phase shedding controller, and configured to generate the switch control signal and the phase output signal based on the phase control signal, phase input signal and phase shedding control signal.

4. The control circuit of claim 1, wherein the phase control signal includes a plurality of pulses for successively triggering the plurality of switching circuits to provide power to a load, and wherein the control circuit obtains the sequence information based on the phase input signal and phase control signal.

5. The control circuit of claim 4, wherein each pulse of the plurality of pulses in the phase control signal has a different pulse width or a different pulse amplitude compared with the rest of the pulses, and wherein the control circuit samples a pulse in the phase control signal based on the phase input signal, and obtains the sequence information in accordance with the pulse width or pulse amplitude of the sampled pulse.

6. The control circuit of claim 4, wherein the phase control signal has a first pulse with a pulse width or a pulse amplitude different from the rest of the plurality of pulses, and wherein the control circuit monitors the phase control signal and starts counting the pulses when the first pulse is detected, and further obtains the sequence information based on the phase input signal and a count value.

7. The control circuit of claim 1, further comprising:
    a master control unit configured to generate the phase control signal;
    a slave control unit configured to obtain the sequence information based on the phase input signal and the phase control signal, generate the current threshold based on the sequence information, and compare the current indication signal with the current threshold to generate a phase shedding control signal;
    a master slave detection circuit configured to determine whether the control circuit is set as the master control circuit or the slave control circuit, and generate a master slave detection signal to control the master control unit and the slave control unit; and
    a switch control circuit coupled to the salve control unit, and configured to generate the switch control signal and phase output signal based on the phase control signal, phase input signal and phase shedding control signal.

8. The control circuit of claim 7, wherein the master control unit comprises:
    a turn-on signal generator configured to generate a turn-on control signal;
    a signal modulator coupled to the turn-on signal generator, and configured to generate a preprocess signal based on the turn-on control signal; and
    a switch having a first terminal, a second terminal and a control terminal, wherein the first terminal is coupled to the signal modulator to receive the preprocess signal, the second terminal is coupled to the first terminal of the control circuit, and the control terminal is coupled to the master slave detection circuit to receive the master slave detection signal.

9. The control circuit of claim 7, wherein the slave control unit comprises:
    a sequence calculator configured to obtain the sequence information based on the phase control signal and the phase input signal;

a threshold generator coupled to the sequence calculator to receive the sequence information, and configured to generate the current threshold based on the sequence information; and a phase shedding controller coupled to the threshold generator, and configured to compare the current indication signal with the current threshold to generate the phase shedding control signal.

10. A multiphase switching converter comprising:
a plurality of switching circuits coupled in parallel between an input voltage and a load; and
a plurality of control circuits configured in a daisy chain and respectively configured for driving a corresponding one of the plurality of switching circuits; wherein
each of the plurality of control circuits includes:
a first terminal configured to share a phase control signal with the rest of the plurality of control circuits;
a second terminal configured to receive a phase input signal from a previous control circuit in the daisy chain; and
a third terminal configured to provide a phase output signal to a latter control circuit in the daisy chain; wherein
the control circuit generates a current threshold based on a corresponding sequence information, and compares a current indication signal indicative of a load current of the multiphase switching converter with the current threshold to determine whether to enter into a phase shedding mode; and wherein
in the phase shedding mode, the control circuit stops the corresponding switching circuit from providing power to the load, and gets the phase output signal to be substantially identical to the phase input signal.

11. The multiphase switching converter of claim 10, wherein a phase adding threshold and a phase shedding threshold are generated based on the current threshold and are compared with the current indication signal, and wherein the control circuit enters into the phase shedding mode when the current indication signal is lower than the phase shedding threshold, and resumes to normal operation when the current indication signal becomes larger than the phase adding threshold.

12. The multiphase switching converter of claim 10, wherein the phase control signal includes a plurality of pulses for successively triggering the plurality of switching circuits to provide power to the load, and wherein the control circuit obtains the corresponding sequence information based on the phase input signal and phase control signal.

13. The multiphase switching converter of claim 12, wherein each pulse of the plurality of pulses in the phase control signal has a different pulse width or a different pulse amplitude compared with the rest of the pulses, and wherein the control circuit samples a pulse in the phase control signal based on the phase input signal, and obtains the corresponding sequence information in accordance with the pulse width or pulse amplitude of the sampled pulse.

14. The multiphase switching converter of claim 12, wherein the phase control signal has a first pulse with a pulse width or a pulse amplitude different from the rest of the plurality of pulses, and wherein the control circuit monitors the phase control signal and starts counting the pulses when the first pulse is detected, and further obtains the corresponding sequence information based on the phase input signal and a count value.

15. The multiphase switching converter of claim 10, wherein the control circuit further comprises:
a master control unit configured to generate the phase control signal;
a slave control unit configured to obtain the sequence information based on the phase input signal and the phase control signal, generate the current threshold based on the sequence information, and compare the current indication signal with the current threshold to generate a phase shedding control signal;
a master slave detection circuit configured to determine whether the control circuit is set as the master control circuit or the slave control circuit, and generate a master slave detection signal to control the master control unit and the slave control unit; and
a switch control circuit coupled to the salve control unit, and configured to generate the phase output signal, and based on the phase input signal and phase control signal, the control circuit generates the phase output signal, and a switch control signal for controlling the corresponding switching circuit, based on the phase control signal, phase input signal and phase shedding control signal.

16. A phase shedding control method used in a control circuit of a multiphase switching converter, wherein the multiphase switching converter includes a plurality of switching circuits coupled in parallel, and a plurality of control circuits configured in a daisy chain and respectively configured for driving a corresponding one of the plurality of switching circuits, the phase shedding control method comprises:
obtaining a current indication signal indicative of a load current of the multiphase switching converter;
obtaining a sequence information of the control circuit;
generating a current threshold based on the sequence information; and
comparing the current indication signal with the current threshold to determine whether to disable the corresponding switching circuit of the control circuit.

17. The phase shedding control method of claim 16, wherein the step of comparing the current indication signal with the current threshold comprises:
generating a phase adding threshold and a phase shedding threshold based on the current threshold;
comparing the current indication signal with the phase adding threshold and phase shedding threshold;
disabling the corresponding switching circuit when the current indication signal is lower than the phase shedding threshold; and
resuming to normal operation when the current indication signal becomes larger than the phase adding threshold.

18. The phase shedding control method of claim 16, wherein each of the control circuits includes a first terminal, a second terminal and a third terminal, the first terminal is configured to share a phase control signal with the rest of the plurality of control circuits, the second terminal is configured to receive a phase input signal from a previous control circuit in the daisy chain, the third terminal is configured to provide a phase output signal to a latter control circuit in the daisy chain, and wherein the phase control signal includes a plurality of pulses for successively triggering the plurality of switching circuits to provide power to a load, and the sequence information of the control circuit is obtained based on the phase input signal and phase control signal.

19. The phase shedding control method of claim 18, wherein each pulse of the plurality of pulses in the phase control signal has a different pulse width or a different pulse amplitude compared with the rest of the pulses, and wherein the step of obtaining the sequence information of the control circuit comprises:

sampling a pulse in the phase control signal based on the phase input signal; and obtaining the sequence information in accordance with the pulse width or pulse amplitude of the sampled pulse.

20. The phase shedding control method of claim 18, wherein the phase control signal has a first pulse with pulse width or pulse amplitude different from the rest of the plurality of pulses, and wherein the step of obtaining the sequence information of the control circuit comprises:

monitoring the phase control signal and starting to count the pulses when the first pulse is detected; and obtaining the sequence information based on the phase input signal and a count value.

* * * * *